(12) United States Patent
Oh et al.

(10) Patent No.: US 7,199,793 B2
(45) Date of Patent: Apr. 3, 2007

(54) IMAGE-BASED MODELING AND PHOTO EDITING

(75) Inventors: Byong Mok Oh, Newton, MA (US); Fredo Durand, Boston, MA (US); Max Chen, San Francisco, CA (US)

(73) Assignee: Mok3, Inc., Waltham, MA (US)

( * ) Notice: Subject to any disclaimer, the term of this patent is extended or adjusted under 35 U.S.C. 154(b) by 380 days.

(21) Appl. No.: 10/441,972

(22) Filed: May 20, 2003

(65) Prior Publication Data

US 2004/0095357 A1    May 20, 2004

Related U.S. Application Data

(60) Provisional application No. 60/382,259, filed on May 21, 2002.

(51) Int. Cl.
  *G06T 15/00*    (2006.01)
(52) U.S. Cl. ............... 345/419; 345/421; 345/422; 345/423; 382/47; 382/284
(58) Field of Classification Search ............... 345/419, 345/421–423; 382/284, 294, 47
  See application file for complete search history.

(56) References Cited

U.S. PATENT DOCUMENTS

| | | | |
|---|---|---|---|
| 5,131,058 A | 7/1992 | Ting et al. ................ 382/47 |
| 5,347,620 A | 9/1994 | Zimmer .................... 395/129 |
| 5,469,536 A | 11/1995 | Blank ........................ 395/131 |
| 5,511,153 A | 4/1996 | Azarbayejani et al. ...... 395/119 |
| 5,544,291 A | 8/1996 | Gilley et al. ............... 395/123 |
| 5,649,173 A | 7/1997 | Lentz ........................ 395/513 |
| 5,706,416 A | 1/1998 | Mann et al. ............... 395/127 |
| 5,710,833 A | 1/1998 | Moghaddam et al. ....... 382/228 |
| 5,719,599 A | 2/1998 | Yang ......................... 345/430 |
| 5,745,666 A | 4/1998 | Gilley et al. ............... 395/128 |
| 5,767,860 A | 6/1998 | Zimmer et al. ............. 345/441 |
| 5,808,623 A | 9/1998 | Hamburg ................... 345/433 |
| 5,828,793 A | 10/1998 | Mann ........................ 382/284 |
| 5,946,425 A | 8/1999 | Bove, Jr. et al. ........... 382/294 |
| 5,990,900 A | 11/1999 | Seago ....................... 345/427 |
| 6,084,592 A | 7/2000 | Shum et al. ............... 345/425 |
| 6,134,345 A | 10/2000 | Berman et al. ............ 382/162 |
| 6,134,346 A | 10/2000 | Berman et al. ............ 382/163 |
| 6,147,688 A | 11/2000 | Clair ........................ 345/423 |
| 6,147,689 A | 11/2000 | Schiller ..................... 345/423 |

(Continued)

OTHER PUBLICATIONS

Agrawala, M., Beers, A. C., and Levoy, M. 1995. 3d Painting on Scanned Surfaces. In 1995 Symposium on Interactive 3D Graphics, ACM SIGGRAPH, pp. 145-150. ISBN 0-89791-736-7.

(Continued)

*Primary Examiner*—Phu K. Nguyen
(74) *Attorney, Agent, or Firm*—Bromberg & Sunstein LLP

(57) ABSTRACT

The invention provides a variety of tools and techniques for adding depth information to photographic images, and for editing and manipulating images that include depth information. The tools for working with such images include tools for "painting" in a depth channel, for using geometric primitives and other three-dimensional shapes to define depth in a two-dimensional image, and tools for "clone brushing" portions of an image with depth information while taking the depth information and lighting into account when copying from one portion of the image to another. The tools also include relighting tools that separate illumination information from texture information.

46 Claims, 23 Drawing Sheets

U.S. PATENT DOCUMENTS

| | | | |
|---|---|---|---|
| 6,226,000 B1 | 5/2001 | Richens et al. | 345/419 |
| 6,268,846 B1 | 7/2001 | Georgiev | 345/138 |
| 6,333,749 B1 | 12/2001 | Reinhardt et al. | 345/629 |
| 6,421,049 B1 | 7/2002 | Reinhardt et al. | 345/420 |
| 6,512,518 B2 * | 1/2003 | Dimsdale | 345/427 |
| 6,590,573 B1 * | 7/2003 | Geshwind | 345/419 |
| 6,674,430 B1 * | 1/2004 | Kaufman et al. | 345/419 |
| 6,741,242 B1 * | 5/2004 | Itoh et al. | 345/419 |
| 6,847,462 B1 * | 1/2005 | Kacyra et al. | 356/601 |

OTHER PUBLICATIONS

ALLIAS. http://www.alias.com, Oct. 7, 2003.

APPLE. http://apple.com/quicktime, Sep. 9, 2003.

Bertalmio, M., Sapiro, G., Caselles, V., and Ballester, C. 2000. Image Inpainting. In Proceedings of ACM SIGGRAPH 2000, ACM Press/ACM SIGGRAPH/Addison Wesley Longman, Computer Graphics Proceedings, Annual Conference Series, 417-424. ISBN 1-58113-208-5.

Boivin, S.,and Gagalowicz, A. 2001. Image-based Rendering of Diffuse, Specular and Glossy Surfaces from a Single Image. In Proceedings of ACM SIGGRAPH 2001, ACM Press/ACM SIGGRAPH, Computer Graphics Proceedings, Annual Conference Series, pp. 107-116. ISBN 1-58113-292-1.

Buehler, C., Bosse, M., McMillan L., Gortler, S.J. and Cohen, M.F. 2001. Unstructured Lumigraph Rendering. In Proceedings of ACM SIGGRAPH 2001, ACM Press/ACM SIGGRAPH, Computer Graphics Proceedings, Annual Conference Series, pp. 425-432. ISBN 1-58113-292-1.

CANOMA. Http://www.canoma.com, Sep. 2003.

Chen, M. 2001. Interactive Specification and Acquisition of Depth from Single Images. Master's thesis, Massachussetts Institute of Technology.

Chuang, Y. Y., Curless, B., Salesin, D. H., and Szeliski, R. 2001. A Bayesian Approach to Digital Matting. IEEE Computer Vision and Pattern Recognition.

Cohen, M. F., Shenchang, E. C., Wallace, J. R., and Greenberg, D. P. 1988. A Progressive Refinement Approach to Fast Radiosity Image Generation. In Computer Graphics (Proceedings of SIGGRAPH 1988), vol. 22, 4, pp. 75-84 (1988).

Criminisi A., Reid, I., and Zissman, A. 1999. Single View Metrology. International Conference on Computer Vision, pp. 434-442.

Debevec, "Light Probe Image Gallery", http://www.debevec.org/probes, Oct. 2003.

Debevec, "The Campanile Movie", SIGGRAPH 97 Electronic Theater (1997).

Debevec, P.E., Yu, Y., and Borshukuv, G.D. 1988. Efficient View-Dependent Image-Based Rendering with Projective Texture-Mapping. In Eurographics Rendering Workshop 1998, Springer, Wein/Eurographics, Vienna, Austria, pp. 105-116 ISBN 3-211-8323-0.

Desbrun, M., Meyer, M., Schr Oder, P., and Barr, A. H. 2000. Anisotropic Feature-Preserving Denoising of Height Fields and Bivariate Data. In Graphics Interface, pp. 145-152. ISBN 1-55860-632-7.

DISCREET. http://www.discreet.com, Sep. 2003.

Drettakis, G., and Sillion, F. X. 1997. Interactive Update of Global Illumination Using a Line-Space Hierarchy. In Proceedings of SIGGRAPH 1997, ACM SIGGRAPH/Addison Wesley, Los Angeles, California, Computer Graphics Proceedings, Annual Conference Series. ISBN 0-89791-896-7.

Durand, F., and Dorsey, J. 2002. Fast Bilateral Filtering for the Display of High-Dynamic-Range Images. In Proceedings of SIGGRAPH 2002, ACM SIGGRAPH/Addison Wesley Longman, Computer Graphics Proceedings, Annual Conference Series, To Be Published.

The GIMP. http://gimp.org, Sep. 2003.

Gleicher, M. 1995. Image Snapping. Proceedings of SIGGRAPH 1995 (Aug.), pp. 183-190. ISBN 0-201-84776-0. Held in Los Angeles, California.

Guillou, E., Meneveaux, D., Maisel, E. and Bouatouch, K. 2000. Using vanishing points for camera Calibration and course 3d reconstruction from a single image. The Visual Computer 16, 7, pp. 396-410 ISSN 0178-2789 (2000).

Heckbert, P.S. 1989. Fundamentals of Texture Mapping and Image Warping. Master's thesis, Jun. 17, 1989.

Horn, "Height and Gradient from Shading", Massachusetts Institute of Technology (1989).

The IESNA Lighting Handbook, Reference and Applications, 9th ed. IESNA. 9th ed., I.E.S. of North America (2000).

Igehy, H., and Pereira, L. 1997. Image Replacement through Texture Synthesis. In IEEE International Conference on Image Processing.

ILLUSTRATOR. http://www.adobe.com/products/illustrator, Sep. 2003.

IPIX. http://ipix.com, Sep. 2003.

ISEE. http://iseemedia.com, Sep. 2003.

Jobson et al., "A Multiscale Retinex for Bridging the Gap Between Color Images and the Human Observation of Scenes", IEEE Transactions on Image Processing, Special Issue on Color Processing (Jul. 1997).

Liebowitz, D., and Zisserman, A. 1998. Metric Rectification for Perspective Images of Planes. In Proceedings of the Conference on Computer Vision and Pattern Recognition, 1998.

Mark, W. 1999. Post-Rendering 3D Image Warping: Visibility, Reconstruction, and Performance for Depth-Image Warping. PhD thesis, University of North Carolina at Chapel Hill.

Matusik, W., Buehler, C., Raskar, R., Gortler, S. J., and McMillan, L. 2000. Image-Based Visual Hulls. In Proceedings of ACM SIGGRAPH 2000, ACM Press/ACM SIGGRAPH/AddisonWesley Longman, Computer Graphics Proceedings, Annual Conference Series, pp. 369-374. ISBN 1-58113-208-5. pp. 369-374. ISBN 1-58113-208-5.

McMillan, L. 1995. A List-Priority Rendering Algorithm for Redisplaying Projected Surfaces. Tech. Rep. TR95-005, 14.

Mortensen, E. N., and Barrett, W. A. 1995. Interactive Segmentation with Intelligent Scissors. In Proceedings of SIGGRAPH 1995, ACM SIGGRAPH/Addison Wesley, Los Angeles, California, Computer Graphics Proceedings, Annual Conference Series, pp. 191-198. ISBN 0-201-84776-0.

Oh, B. M., Chen, M., Dorsey, J., and Durand, F. 2001. Image-Based Modeling and Photo Editing. In Proceedings of ACM SIGGRAPH 2001, ACM Press/ACM SIGGRAPH, Computer Graphics Proceedings, Annual Conference Series, pp. 433-442. ISBN 1-58113-292-1.

PHANTOM. http://sensable.com/products/phantom_ghost/phantom.asp, Sep. 2003.

PHOTOMODELER. http://photomodeler.com, Oct. 2003.

PHOTOSHOP. http://adobe.com/products/photoshop/main.html, Oct. 2003.

PIXOLOGIC. http://www.pixologic.com, Oct. 2003.

Porter, T., and Duff, T. 1984. Compositing Digital Images. In Computer Graphics (Proceedings of SIGGRAPH 1984), vol. 18, pp. 253-259.

Press, W., Teukolsky, S., Vetterling, W. and Flannery, B. 1992. Numerical Recipes, 2nd ed. Cambridge University Press, pp. 393, 683-688, 825 (1992).

Pulli, K., Cohen, M., Duchamp, T., Hoppe, H., Shapiro, L., and Stuetzle, W. 1997. View-based Rendering: Visualizing Real Objects from Scanned Range and Color Data. In Rendering Techniques 1997 (Proceedings of the Eighth Eurographics Workshop on Rendering), Springer Wien, New York, NY, J. Dorsey and P. Slusallek, Eds.

Rangaswamy, S. 1998. Interactive Editing Tools for Image-Based Rendering Systems. Master's thesis, Massachusetts Institute of Technology.

REALVIZ. Image modeler. http://realviz.com, Oct. 2003.

RIGHTHEMISHPERE. http://righthemisphere.com.

Roxio. http://www.roxio.com/en/products/enterprise_solutions/photosuite/features.jhtml, Oct. 2003.

Ruzon, M. A., and Tomasi, C. 2000. Alpha Estimation in Natural Images. IEEE Computer Vision and Pattern Recognition.

Seitz, S. M., and Dyer, C. R. 1997. Photorealistic Scene Reconstruction by Voxel Coloring, Journal of Computer Vision, 35,2, pp. 1-32 (1999).

Semple et al., "Algebraic Projective Geometry", Oxford at the Clarendon Press (1952).

Sethian, J. A. 1999. Level Set Methods and Fast Marching Methods. Cambridge University Press, Cambridge, UK.

Taylor, C., and Kriegman, D. 1992. Structure and Motion from Line Segments in Multiple Images.

Technical Academy Award 1998. http://alvyray.com/awards/awardsmain.htm, Sep. 2003.

Tolba, O. 2001. A Projective Approach to Computer-Aided Drawing. PhD thesis, Massachusetts Institute of Technology.

Tolba, O., Dorsey, J., and McMillan, L. 2001. A Projective Drawing System. In 2001 ACM Symposium on Interactive 3D Graphics, pp. 25-34. ISBN 1-58113-292-1.

Tumblin, J., and Turk, G. 1999. LCIS: A Boundary Hierarchy for Detail-Preserving Contrast Reduction. In Proceedings of SIGGRAPH 1999, ACM SIGGRAPH/Addison Wesley Longman, Los Angeles, California, Computer Graphics Proceedings, Annual Conference Series, pp. 83-90. ISBN 0-20148-560-5.

Ward, "The RADIANCE Lighting Simulation and Rendering System", Proceedings of SIGGRAPH 1994, ACM SIGGRAPH/ACM Press, Orlando, Florida, Computer Graphics Proceedings, Annual Conference Series, 459-472. ISBN 0-089791-667-0 (1994).

Ward, "Measuring and Modeling Anisotropic Reflection", Computer Graphics, 26, 2, pp. 265-272 (Jul. 1992).

Ward, "Real Pixels", Graphics Gems II, Academic Press, Boston, pp. 80-83. ISBN 0-12-064481-9 (1991).

Yang et al., "Synthetic Aperture Camera Array", http://graphics.lcs.mit.edu/~jcang/cameraarray/cameraarry.htm, Oct. 2003.

Yu, Y., and Malik, J. 1998. Recovering photometric properties of architectural scenes from photographs. In Proceedings of SIGGRAPH 1998, ACM SIGGRAPH/Addison Wesley, Orlando, Florida, Computer Graphics Proceedings, Annual Conference Series, pp. 207-218. ISBN 0-89791-999-8.

Zhang, H. 1999. A derivation of image-based rendering for conventional three-dimensional graphics. Journal of Graphics Tools 4, 2, pp. 27-36. ISSN 1086-76.

Zhang, L., Dugas-Phocion, G., Samson, J.-S., and Seitz, S. 2001. Single View Modeling of Free-Form scenes. IEEE Computer Vision and Pattern Recognition.

V. Blanz and T. Vetter. A morphable model for the synthesis of 3d faces. Proc. of SIGGRAPH, 1999.

E. Chen. Quicktime VR—an image-based approach to virtual environment navigation. Proc. of SIGGRAPH, 1995.

E. Chen and L. Williams. View Interpolation for image synthesis. In Proc. of SIGGRAPH, 1993.

P. Debevec. Rendering synthetic objects into real scenes: Bridging traditional and image-based graphics with global illumination and high dynamic range photography. In Proc. of SIGGRAPH, 1998.

P. Debevec and J. Malik. Recovering high dynamic range radiance maps from photographs. Proc. of SIGGRAPH, 1997.

G. Drettakis, L. Robert, and S. Bougnoux. Interactive common illumination for computer augmented reality. Eurographics Rendering Workshop, 1997.

P. Debevec, C. Taylor, and J. Malik. Modeling and rendering architecture from photographs: A hybrid geometry- and image-based approach. In Proc. of SIGGRAPH 96, 1996.

J. Elder and R. Goldberg. Image editing in the contour domain. IEEE Trans. on Pattern Analysis and Machine Intelligence, 23(3), 2001.

A. Founier, A. Gunawan, and C. Romanzin. Common illumination between real and computer generated scenes. Graphics Interface, 1993.

O. Faugeras, S. Laveau, L. Robert, G. Csurka, and C. Zeller. 3-d reconstruction of urban scenes from sequences of images. In A. Gruen, O. Kuebler, and P. Agouris, editors, Automatic Extraction of Man-Made Objects from Aerial and Space Images. Birkhauser, 1995.

S.. Gortler, R. Grzeszczuk, R. Szeliski, and M. Cohen. The lumigraph. In Proc. of SIGGRAPH, 1996.

Y. Horry, K. Anjyo, and K. Arai. Tour into the picture: Using a spidery mesh interface to make animation from a single image. In Proc. of SIGGRAPH 97, 1997.

P. Hanrahan and P. Haeberli. Direct wysiwyg painting and texturing on 3d shapes. Proc. of SIGGRAPH, 1990.

T. Igarashi, S. Matsuoka, and H. Tanaka. Teddy: A sketching interface for 3D freeform design. In Siggraph, Los Angeles, 1999.

S. Kang. Depth painting for image-based rendering applications. Tech. report, CRL, Compaq Cambridge Research Lab, 1998. http://www.research.microsoft.com/Users/sbkang/publications/index.html.

D. Liebowitz, A. Criminisi, and A. Zisserman. Creating architectural models from images. In Proc. of Eurographics, 1999.

C. Loscos, G. Drettakis, and L. Robert. Interactive virtual relighting of real scenes. IEEE Trans. on Visualization and Computer Graphics, 6(3), 2000.

S. Laveau and O. Faugeras. 3-D scene representation as a collection of images and fundamental matrices. In Proc. of 12th Int. Conf. on Pattern Recognition, vol. 1, pp. 689-691, 1994.

C. Loscos, M.C. Frasson, G. Drettakis, B. Walter, X. Granier, and P. Poulin. Interactive virtual relighting and remodeling of real scenes. Eurographics Rendering Workshop, 1999.

M. Levoy and P. Hanrahan. Light field rendering. In Proc. of SIGGRAPH, 1996.

B. L'evy and JL Mallet. Non-distorted texture mapping for sheared triangulated meshes. In Proc. of SIGGRAPH, 1998.

JL Mallet. Discrete smooth interpolation. ACM Trans. on Graphics, 8(2):121-144, 1989.

L. McMillan and G. Bishop. Plenoptic modeling: An image-based rendering system. In Proc. of SIGGRAPH, 1995.

L. McMillan. An Image-based Approach to Three-Dimensional Computer Graphics. PhD thesis, U. of North Carolina, Chapel Hill, 1997.

W. Mark, L. McMillan, and G. Bishop. Post-rendering 3D warping. In ACM Symp. on Interactive 3D Graphics, 1997.

S. K. Nayar and R. M. Bolle. Computing reflectance ratios from an image. Pattern recognition, 7, 1993.

P. Perona and J. Malik. Scale-space and edge detection using anisotropic diffusion. IEEE Trans. on Pattern Analysis and Machine Intelligence, 12(7):629-639, Jul. 1990.

P. Poulin, M. Ouimet, and M.C. Frasson. Interactively modeling with photogrammetry. In Eurographics Workshop on Rendering, 1998.

P. Poulin, K. Ratib, and M. Jacques. Sketching shadows and highlights to position lights. In Proc. of Computer Graphics International 97, 1997.

F. Sillion and G. Drettakis. Feature-based control of visibility error: A multi-resolution clustering algorithm for global illumination. In Proc. SIGGRAPH, 1995.

J. Shade, S. Gortler, L. He, and R. Szeliski. Layered depth images. In Proc. of SIGGRAPH, 1998.

S. Seitz and K. Kutulakos. Plenoptic image editing. In Proc. 5th Int. Conf.on Computer Vision, 1998.1.

M. Segal, C. Korobkin, R. van Widenfelt, J. Foran, and P. Haeberli. Fast shadows and lighting effects using texture mapping. Proc. of SIGGRAPH, 1992.

C. Tomasi and R. Manduchi. Bilateral filtering for gray and color images. In IEEE Int. Conf. on Computer Vision, 1998.

J. Y. A. Wang and E. H. Adelson. Representing moving images with layers. IEEE Trans. on Image Processing, 3(5):625-638, 1994.

L. Williams, 3d paint. In 1990 Symposium on Interactive 3D Graphics, vol. 24, pp. 225-233. 1990. ISBN 0-89791-351-5.

L. Williams. Image jets, level sets and silhouettes. Workshop on Image-Based Modeling and Renderingt, http://wwwgraphics.stanford.edu/workshops/ibr98/, Mar. 1998.

Y. Yu, P. Debevec, J. Malik, and T. Hawkins. Inverse global illumination: Recovering reflectance models of real scenes from photographs. Proc. of SIGGRAPH, 1999.

* cited by examiner

FIG. 9
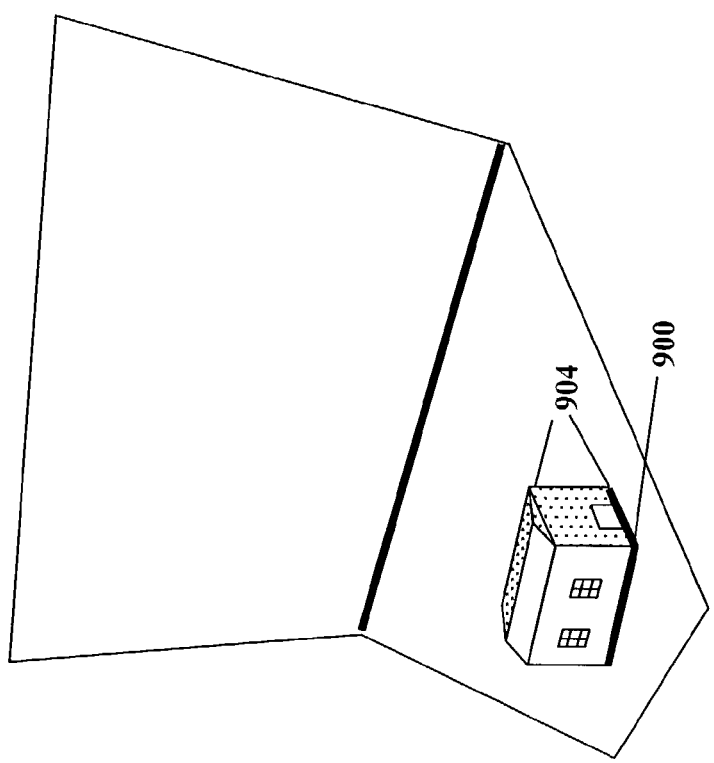
Side view
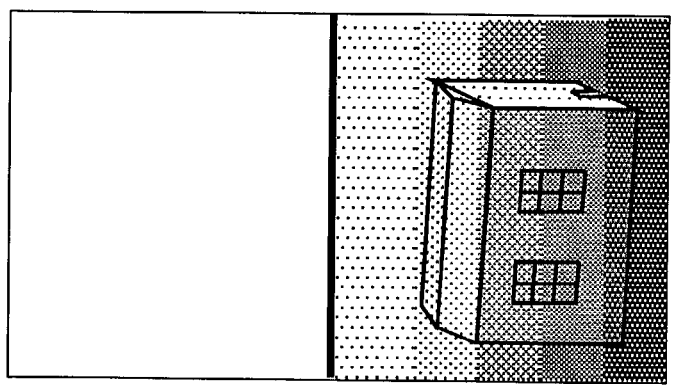
Depth channel
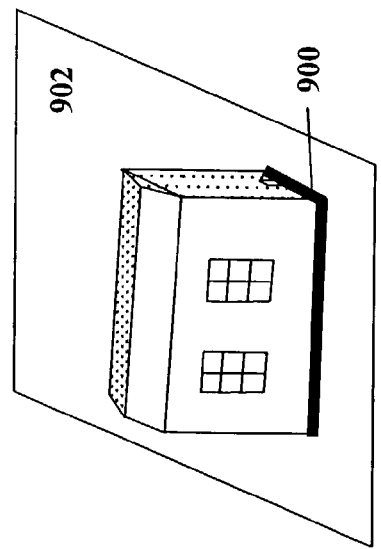
Reference image

FIG. 11
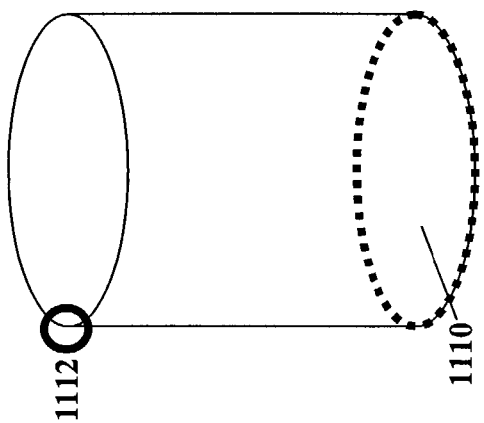
FIG. 11c
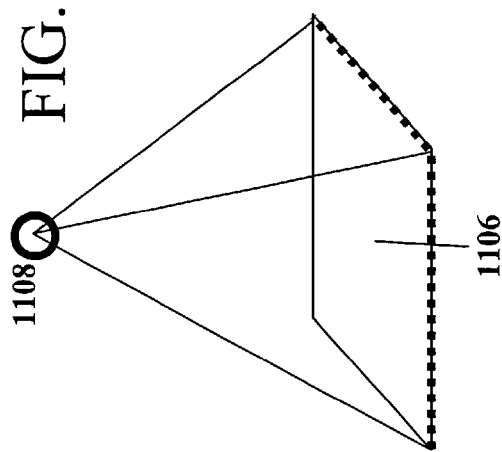
FIG. 11b
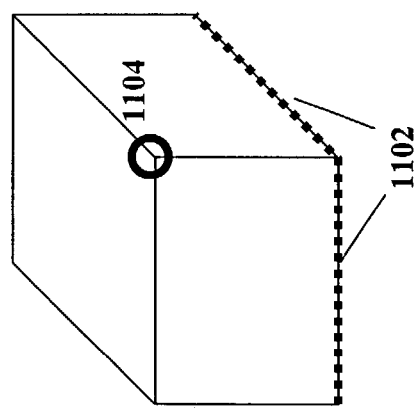
FIG. 11a

FIG. 16
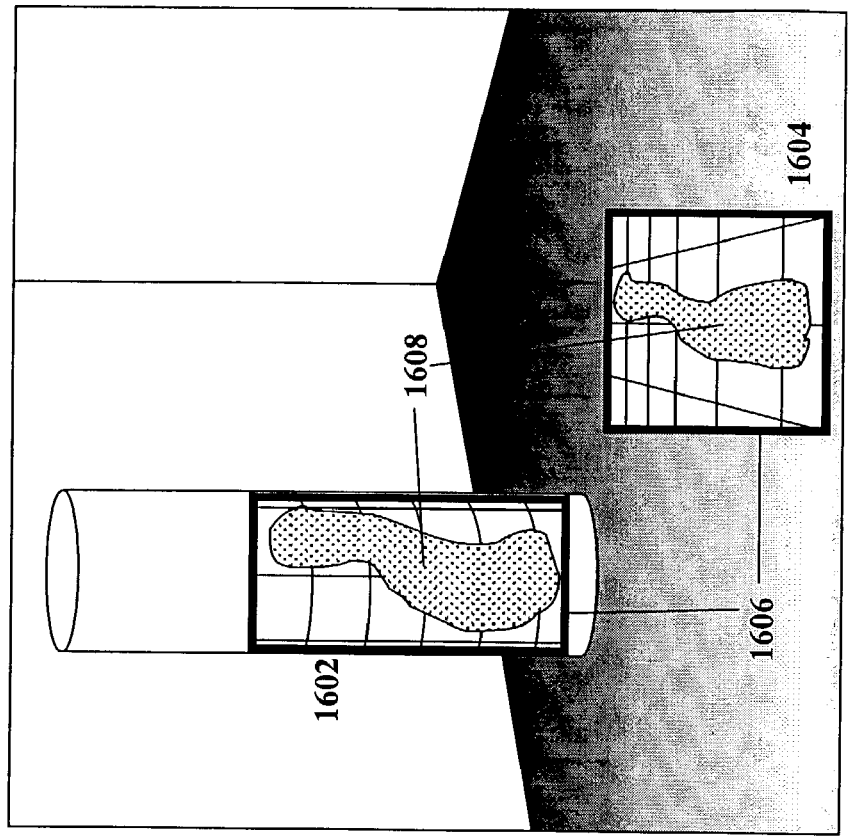
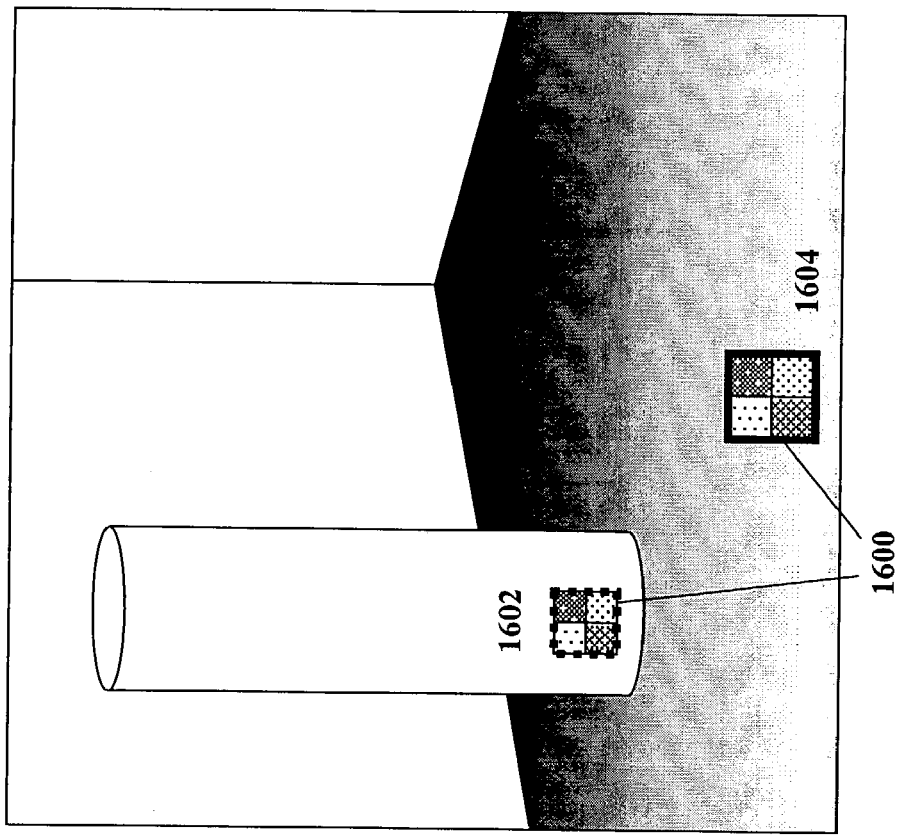

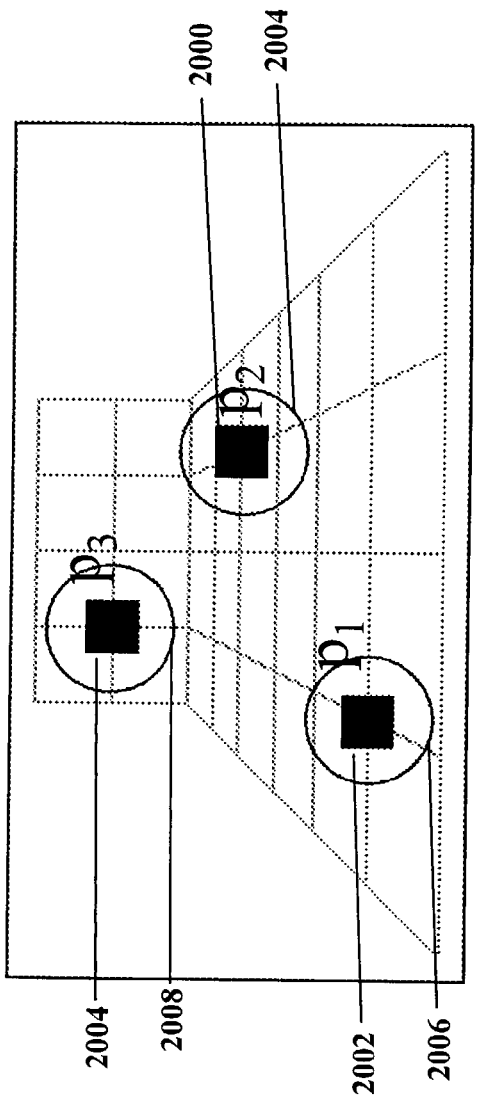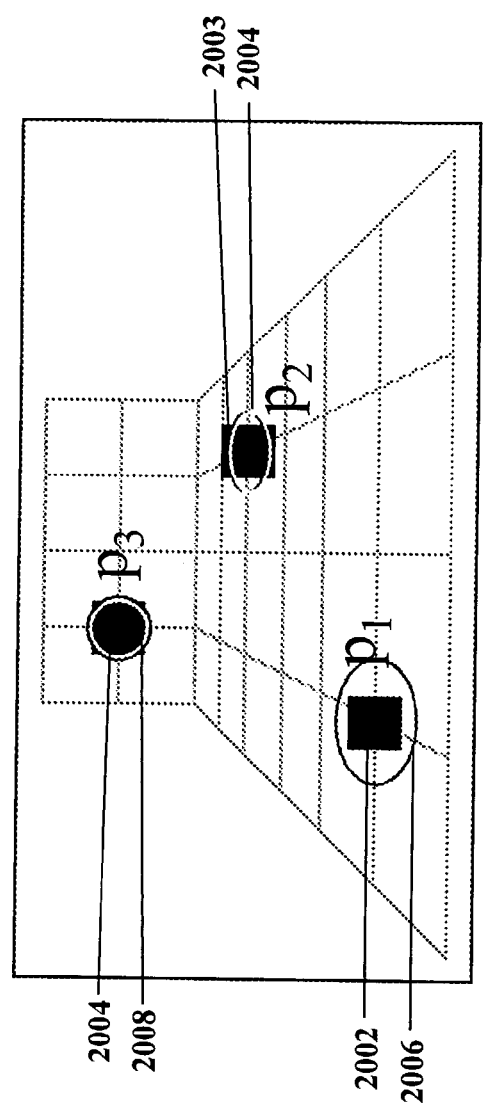
FIG. 20

IMAGE-BASED MODELING AND PHOTO EDITING

CROSS-REFERENCE TO RELATED APPLICATIONS

This application claims the benefit of U.S. Provisional Application No. 60/382,259, entitled "Image-Based Modeling and Photo Editing", filed May 21, 2002.

FIELD OF INVENTION

The invention relates generally to computer graphics. More specifically, the invention relates to a system and methods for editing images that include depth information.

BACKGROUND

An objective in the field of computer graphics is to recreate realistic images of three-dimensional environments using a computer. These images and the models used to generate them have an incredible variety of applications, from movies, games, and other entertainment applications, to architecture, city planning, design, teaching, medicine, and many others.

Traditional techniques in computer graphics attempt to create realistic scenes using geometric modeling, reflection and material modeling, light transport simulation, and perceptual modeling. Despite the tremendous advances that have been made in these areas in recent years, such computer modeling techniques are not able to create convincing photorealistic images of real and complex scenes.

An alternate approach, known as image-based modeling and rendering (IBMR) is becoming increasingly popular, both in computer vision and graphics. IBMR techniques focus on the creation of three-dimensional rendered scenes starting from photographs of the real world. Often, multiple photographs, taken from various viewpoints are used to derive an "image-based representation" of a scene, which includes information on the geometry, textures, and lighting of the scene. This information may be used to render photorealistic images of the scene from novel viewpoints.

Existing IBMR techniques have focused on the problems of modeling and rendering captured scenes from photographs, while little attention has been given to the problems of interactively creating or editing an image-based representation. While numerous software packages (such as ADOBE PHOTOSHOP, by Adobe Systems Incorporated, of San Jose, Calif.) provide photo-editing capabilities, none of these packages adequately addresses the problems of interactively creating or editing image-based representations of three-dimensional scenes.

What is needed is editing software that includes familiar photo-editing tools adapted to handle depth, geometry, and lighting information in an image-based representation of a three-dimensional scene.

SUMMARY OF THE INVENTION

The invention provides a variety of tools and techniques for adding depth information to photographic images, and for editing and manipulating photographic images that include depth information. The tools for working with such images include tools for "painting" in a depth channel, for using geometric primitives and other three-dimensional shapes to define depth in a two-dimensional image, and tools for "clone brushing" portions of an image with depth information while taking the depth information and lighting into account when copying from one portion of the image to another. The tools also include relighting tools that separate illumination information from texture information.

In general, the system and method of the invention display results quickly, for use in interactively adding depth information to two-dimensional images and editing images that include depth information. In some cases, this is achieved by using techniques that provide visually compelling results, which are not necessarily completely physically accurate.

In one aspect, the invention provides a data structure for representing a three-dimensional image, the data structure including two or more layers. Each layer of the data structure includes a collection of color channel values, and a collection of depth channel values, each of which corresponds to one of the color channel values. Each layer also includes an object that represents a reference camera, so for each layer the depth information on the collection of depth channel values is relative to the position of the reference camera for that layer.

In some embodiments, the data structure also includes additional channels of information stored as collections of values, such as a collection of alpha-channel values, a collection of texture channel values, a collection of illuminance channel values, or a collection of normal channel values. In general, each value in these additional collections of values corresponds to one of the color channel value in t the collection of color channel values.

In some embodiments, the collection of color channel values is a two-dimensional array, and each value in the collection of color channel values represents the color channel value of a pixel in an image.

In some embodiments, the object representing the reference camera includes a world-to-image projection matrix that specifies a field of view of the reference camera.

In another aspect, the invention provides a method of interactively editing an image containing depth information and reference camera information. The method includes steps of displaying the image from a viewpoint defined by an interactive camera, receiving an edit to the image, transforming the edit to a viewpoint defined by the reference camera, and applying the transformed edit to the image. In this way, a user can edit an image from an interactive viewpoint, and the results of editing the image may be kept in a structure having a viewpoint defined by a reference camera.

In some embodiments, the step of receiving an edit includes receiving an edit to the color information associated with the image, or to the alpha information associated with the image. In some embodiments, receiving an edit includes receiving an edit to the depth information associated with an image. In these embodiments, the method may include providing a user with an interactive drawing tool that specifies edits to the depth information, and receiving edits made by the user using the interactive drawing tool. In some embodiments, the interactive drawing tool specifies a selected value for depth for a selected portion of the image. In some embodiments, the interactive drawing too adds to or subtracts from the depth for a selected portion of the image.

In another aspect, the invention provides a method for assigning depth to an object in an image. The method includes interactively determining a ground reference for the image, and assigning depth information to the object based on the ground reference.

In some embodiments, interactively determining a ground reference involves specifying a horizon line in the image. In some embodiments, it involves specifying a scale factor on depth.

In some embodiments, the ground reference is a planar surface. In some embodiments, the ground reference is a non-planar surface.

In some embodiments, assigning depth information involves using an interactive depth painting tool to specify the depth information. In some embodiments, the depth information is specified using geometric primitives. In some embodiments, a three-dimensional model of an object may be used to specify the depth information.

In a further aspect, the invention relates to a method of painting in an image that includes depth information. The method includes providing a source position and a destination position in the image, identifying a destination region in the image relative to the destination position, and determining a source region in the image relative to the source position, and corresponding to the destination region. The method involves transforming the image information of the source region relative to the depth information of the source region to image information relative to the depth information of the destination region, and copying the transformed image information to the destination region. In this manner, a "clone brush" tool can copy image information from a source to a destination, taking the depth information of each region into account when doing the copying.

In some embodiments, the image has two or more layers. In some such embodiments, the source position is in the first layer, and the destination position is in the second layer.

In some embodiments, additional image information, such as differences in the lighting information or texture information between the source and destination regions may be taken into account when transforming the image.

In some embodiments, the destination region is defined relative to a destination reference camera, and the source region is defined relative to a source reference camera. In such embodiments, transforming the image information involves transforming the image information from a viewpoint defined by the source reference camera to a viewpoint defined by the destination reference camera.

In some embodiments, the method involves temporarily displaying the area around the destination region initialized with image information that approximates the area around the source region. In certain such embodiments, the approximation is a geometric mapping, which may be a planar mapping.

In some embodiments, transforming the image occurs substantially concurrently with a user identifying the destination region. In these embodiments, transforming the image may involve computing a parameterization only for selected "active pixels" substantially concurrently with the user identifying the destination region. In this manner, "clone brushing" can maintain a level of performance that permits interactive use.

In some embodiments, the method further involves factoring the image information into a texture component and an illumination component. In these embodiments, copying the transformed image may include copying the texture component of the transformed image and applying the illumination component of the destination region.

In yet another aspect, the invention provides a method for determining a texture component and an illumination component of an image. The method includes determining the sizes of a small-scale feature in the image and a large-scale feature in the image, and using an edge-preserving filter to place small-scale features into the texture component, and large-scale features into the illumination component.

In some embodiments determining the sizes of small-scale and large-scale features is done by interactively selecting a feature size of a texture.

In some embodiments, determining the sizes involves determining a size and shape of a filter kernel. The edge-preserving filter evaluates image information over an area defined by the filter kernel. In some such embodiments, the image includes depth information, which is used to determine the size and shape of the filter kernel. In some embodiments, normal information is used to determine the size and shape of the filter kernel.

In another aspect, the invention provides a system for interactively editing a three-dimensional image. The system includes a computer having a processor and memory. The memory contains instructions that, when executed by the processor, cause the computer to receive an input image, interact with a user to segment the input image into layers, and interact with the user to apply depth information to the layers.

In some embodiments, the input image is a two-dimensional image, such as a photograph. In some embodiments, the input image is a three-dimensional image that already contains depth information.

In some embodiments, the instructions also cause the computer to interact with the user to edit or relight the layers. In some embodiments, the instructions may cause the computer to copy a source portion of one of the layers to a destination portion of one of the layers, transforming the source portion to take into account differences in the depth information between the source and destination.

BRIEF DESCRIPTION OF THE DRAWINGS

The above and further advantages of the invention may be better understood by referring to the following description taken in conjunction with the accompanying drawings, in which:

FIG. 9 is a diagram illustrating the use of an interactive vertical tool to extrude depth information in accordance with an embodiment of the invention;

FIG. 11 is a diagram illustrating the use of geometric primitives to assign depth information in accordance with an embodiment of the invention;

FIGS. 15 and 16 are diagrams illustrating the use of a non-distorted clone brush tool in accordance with an embodiment of the invention;

FIG. 20 is a diagram illustrating problems encountered by the use of traditional low-pass Gaussian filters for decoupling texture and illuminance;

DETAILED DESCRIPTION

Figure 1:
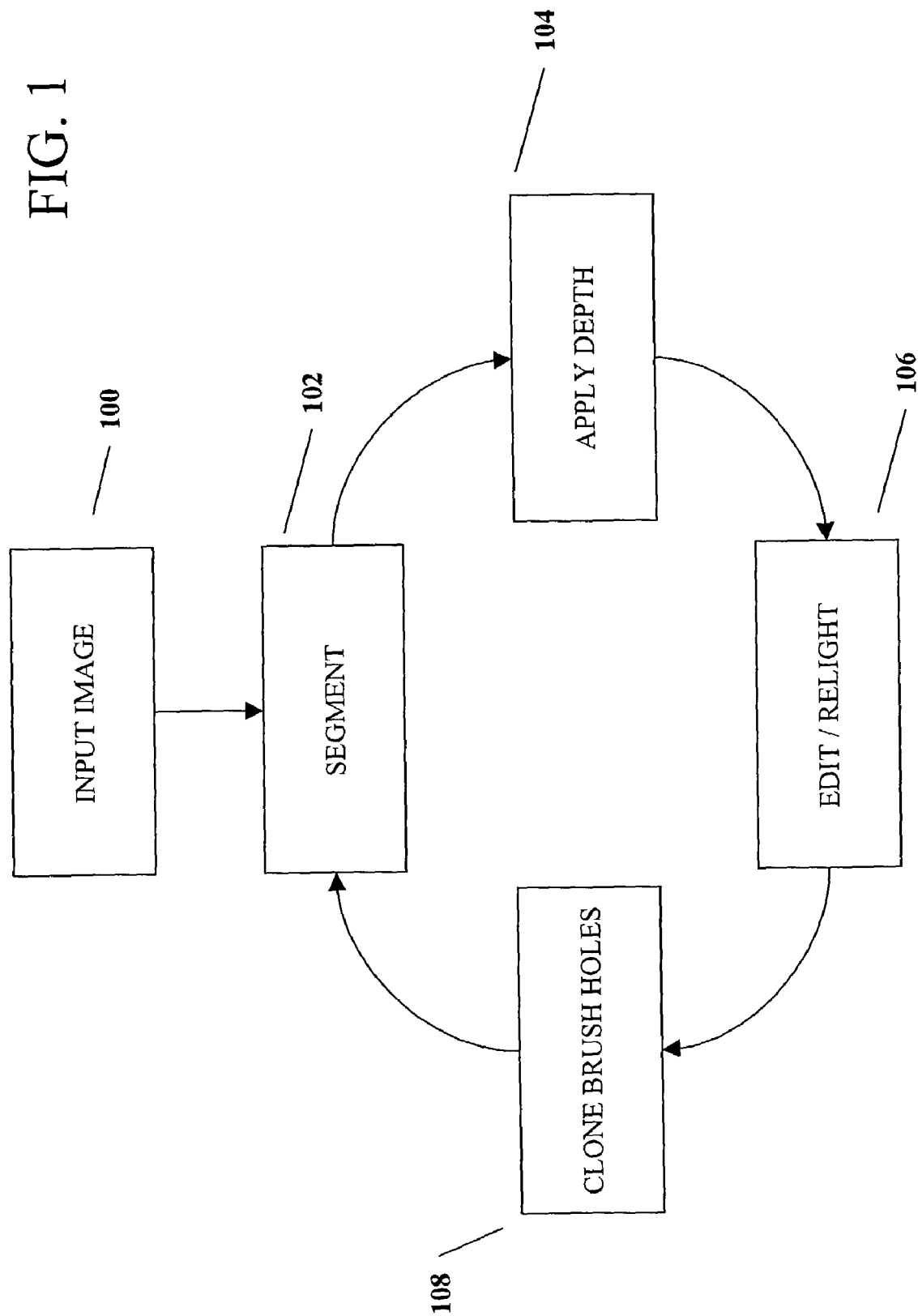
FIG. 1 is a flow diagram of a process to input a two-dimensional image and manipulate the image by adding and editing depth and other information in accordance with an embodiment of the invention.

FIG. 1 illustrates a process to create and edit a three-dimensional (3D) image from an inputted two-dimensional (2D) image in accordance with the invention. A 3D image represents a three-dimensional scene, but may be displayed to a user as a 2D image on, for example, a computer monitor. In a preferred embodiment, the process begins by inputting into a computer system a two-dimensional image in an input image step 100. Alternatively, the computer system can accept for editing a 3D image which already has some depth information. Such 3D images may be acquired from a variety of laser, optical, or other depth measuring techniques for a given field of view. The image may be input by way of a scanner, electronic transfer, via a computer-attached digital camera, or other suitable input mechanism. Once the two-dimensional image has been input into the computer system, a user may begin to transform the image into a three-dimensional image by segmenting the two-dimensional image into layers in a segmenting step 102. In the segmenting step 102, the user may identify different portions of the image to be placed in different layers. A layer generally may comprise an object, such as a building or person. Alternatively, a layer may comprise an object part, such as a window or hand. The segmenting step 102 may involve use of selection, alpha masks, and other traditional image-editing tools.

Once the two-dimensional image has been segmented, the user may apply depth information to the image in a depth applying step 104. The underlying metaphor for applying depth is to paint and draw depth in an interactive manner, similar to traditional methods used for painting color. This provides complete user control, and relies on the user's ability to comprehend the layout of the scene. The level of detail and accuracy of depth that is needed in an image, and which can be refined at any time, depend on the target application and intended viewpoint variation.

Even if a user can easily infer the spatial organization and shapes depicted in the image, it is not always easy to directly paint the corresponding depth. Hence, the depth applying step 104 may make use of depth applying tools, such as a ground plane tool for designating a reference ground plane, extrusion tools, chiseling tools, geometric primitives, templates, and other tools useful for applying depth to an image. In a preferred embodiment, some depth applying tools use pre-defined 3D shapes to aid in painting accurate depth. Preferred embodiments of the invention emphasize 2D, rather than 3D interaction, the direct use of cues present in the image, and the use of previously-assigned depth as a reference.

The present invention allows a user to edit depth from any interactive viewpoint, which may be important in evaluating the effects of current manipulations. For example, a user may wish to edit depth information of an image while viewing the image from the side, from above, from below, or from any combination of view angles. Multiple views, whereby the user can simultaneously view the image from more than one viewpoint, can also be used. Some tools may be easier to use in a standard reference view, where image cues are more clearly visible, while for others, user-defined interactive views permit a better understanding of the shape being modeled.

In a preferred embodiment, the use of selection also permits a user to restrict the effect of a tool to a specific part of the image, providing flexibility and fine control. Because the selections may be real-valued, the effect of depth tools can be attenuated at the selection boundary to obtain smooth shapes. In a preferred embodiment, the selection value is used to interpolate linearly between the unedited and edited values. Other interpolation functions, such as a cosine, could also be used.

In a preferred embodiment, the field of view of the reference camera (i.e., how wide an angle is captured by the camera, as determined by the focal length of the camera lens) is specified. If enough information is available in the image, the field of view can be calculated. The user can also set the focal length manually, or to a default value, (e.g., 50 mm in practice).

After the depth applying step 104 has been performed, a user can edit or relight the image from the same or a different vantage point in an edit/relight step 106.

To paint parts of the scene that are hidden in the image (i.e., located behind other parts of the scene), the user can use a clone brushing tool in a clone brush step 108 in accordance with an embodiment of the invention. In a clone brush step 108, a user can copy a portion of the image to a different portion of the image. Depth, lighting, and other image information can be used to ensure that the copied portion of the image is stored and displayed consistently with the rest of the image, thus avoiding distortion problems due to foreshortening, inconsistent texture, inconsistent lighting, and other problems that may arise when copying portions of a 2D view of a 3D image to another portion of the image.

As the transformation from the original two-dimensional image progresses into a three-dimensional image according to the segmenting step 102, depth applying step 104, edit/relighting step 106, and clone brush step 108, the user can refine the transformation by repeatedly applying any or all of these steps. With more three-dimensional information entered and available, the user can view and interact with the image from a different vantage, where editing can performed more easily.

Figure 2:
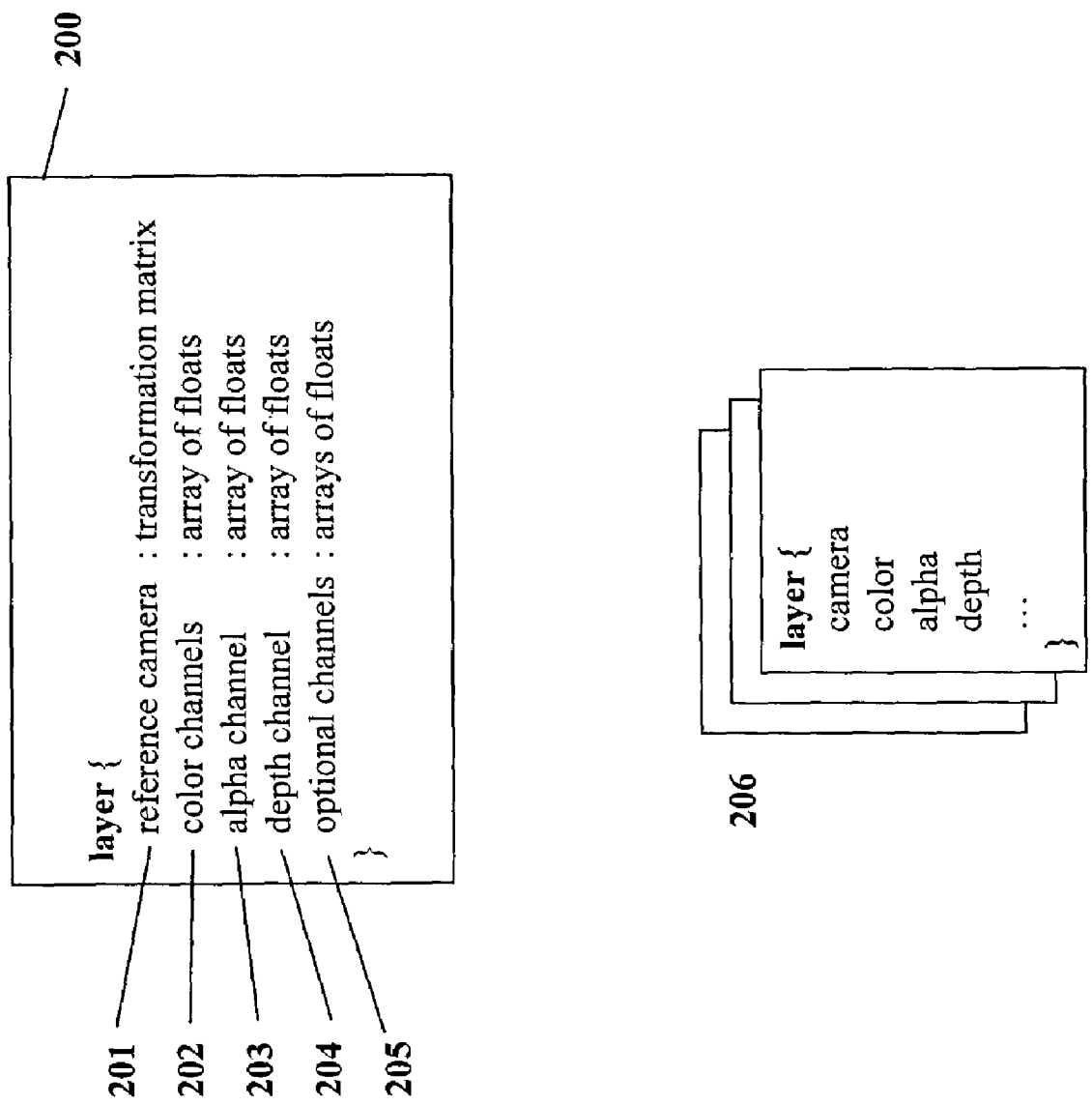
FIG. 2 is a block diagram of a data structure used to store three-dimensional image data in accordance with an embodiment of the invention.

FIG. 2 illustrates the underlying data structure used in a preferred embodiment of the invention. A layer 200 is a data structure comprising information about a reference camera 201, color channels 202, an alpha channel 203, a depth channel 204, and other optional channels 205 such as texture, illuminance, and normal that may be used for specific applications such as relighting. Use of such a structure permits the use of standard image-based rendering techniques. Representing a 2D image in layers is a well-known technique and has been widely used in image-editing software. Such 2D layers do not include depth information or a reference camera. Due to the similarity of data structures, a system in accordance with a preferred embodiment of the invention may offer an import/export interface with formats that can be read by most 2D image-editing programs, by excluding 3D information, such as depth and reference camera information.

A layer has a reference camera 201 that describes its world-to-image projection matrix. Initially, all layers have the same reference camera, which is arbitrarily set to an identity matrix. In a preferred embodiment, it is assumed that the camera is a perfect pinhole camera, and unless other information is available, that the optical center is the center of the image. Thus, only the field of view needs to be specified. The field of view can be entered by the user, or a default value can be used if accuracy is not critical. Standard vision techniques can also be used to determine the field of view if parallelism and orthogonality are present in the image. Note that changing the reference camera is equivalent to moving the objects depicted in the layer in 3D space. Two types of images can be displayed: reference images that are displayed from the viewpoint of the reference camera, and interactive images that are displayed from different viewpoints (i.e., "interactive cameras") to ease user interaction. The degree to which a user can alter the viewpoint, without artifacts, is dependent on the particular scene, assigned depth, and occluded regions.

Color channels 202 are used to assign colors to pixels in the image. In a preferred embodiment, the color channels 202 comprise three individual color channels corresponding to the primary colors red, green and blue, but other color channels could be used. Each pixel in the image has a color represented as a combination of the color channels. An alpha channel 203 is used to handle transparency and object masks. This permits the treatment of semi-transparent objects and fuzzy contours, such as trees or hair. A depth channel 204 is used to assign 3D depth for the pixels in the image.

A 3D image in accordance with the invention comprises a collection of layers 206. Preferably, this layering corresponds to image objects or object parts, rather than layering at the individual pixel level. This representation is amenable to editing, because it organizes the scene into different high-level entities.

Figure 3:
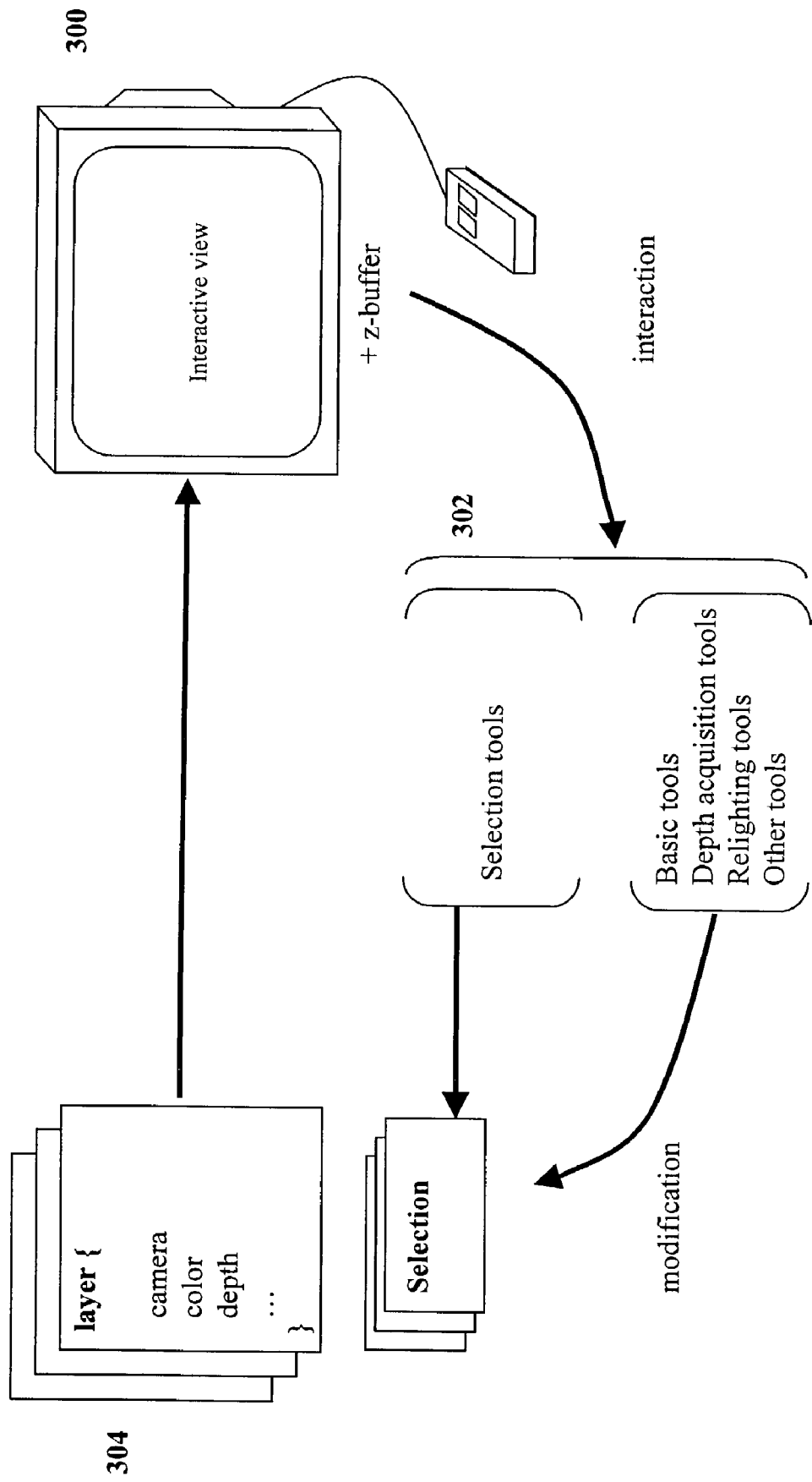
FIG. 3 is a block diagram of a system used to interactively edit an image in accordance with an embodiment of the invention.

FIG. 3 illustrates the architecture of a system in accordance with a preferred embodiment of the invention. The architecture includes an interactive display 300 and a set of tools 302 organized around a common data structure 304. This organization makes it easy to add new functionality. Although the features of the system are presented sequentially, all processes are naturally interleaved. For example, editing can start before depth is acquired, and the representation can be refined while the editing proceeds.

The architecture and data structure used in a preferred allow selection of image portions. The selected image portions may comprise portions of one or multiple image layers. Selection, like channels, is represented as an array corresponding to the reference image. Each pixel of each layer has a selection value, which can be set to any value between 0 and 1 to permit feathering (i.e., the blurring of edges by building a transition boundary between the selection and its surrounding pixels) using selection tools. Selection is used not only for copy-pasting, but also for restricting the action of the depth applying and other tools to relevant areas.

In a preferred embodiment, the interactive display 300 uses triangles and hardware projective texture mapping to render the image. The segmentation of the scene into layers 304 greatly eliminates "rubber-sheet triangle" problems which may arise when a single triangle mesh is applied to an entire scene, and transitions between multiple objects in the scene can be treated inaccurately. Alternatively, other image-based rendering techniques, such as splatting, could be used.

The tools 302, such as depth assignment, selection or painting, can be used from any interactive viewpoint. A z-buffer of the interactive view is read, and view-warping transforms screen coordinates into 3D points or into pixel indices in the reference image. Texture parameter buffers could also be used with a system according to the present invention. The tools 302 can be applied to select and modify a selection 306, which correspondingly updates the collection of layers 304 that comprise the input image.

Figure 4:
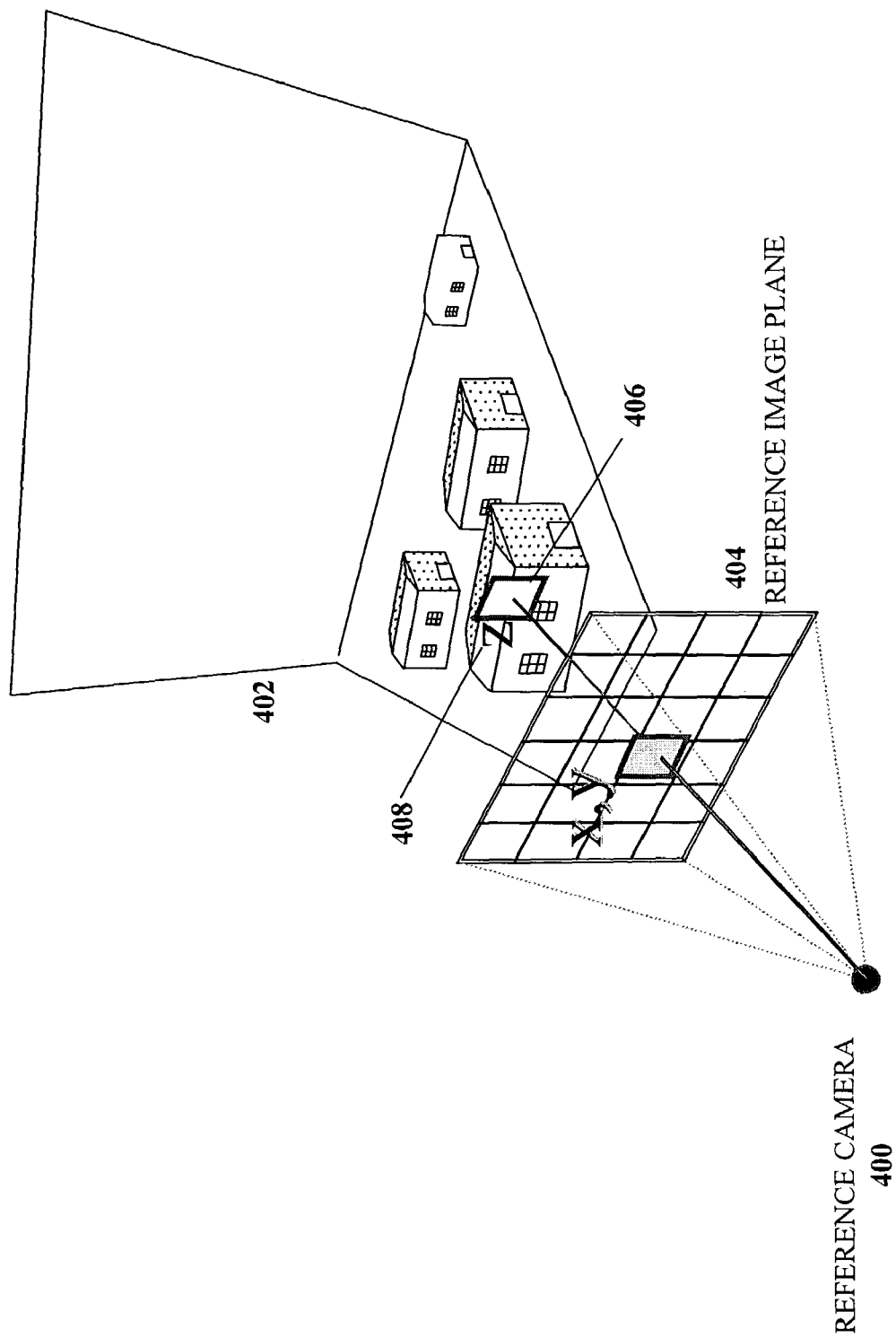
FIG. 4 is a diagram of how depth information may be referenced in accordance with an embodiment of the invention.

FIG. 4 illustrates how depth is represented with respect to a reference camera 400 in accordance with a preferred embodiment of the invention. An image 402 is represented as if viewed from a reference camera 400. The image 402 and reference camera 400 define a two-dimensional reference plane 404, through which the image 402 is referenced. For any portion 406 of the image 402, a depth value z 408 indicates the relative distance from the reference camera 400 to the image portion 406. The x and y coordinates for the image portion 406 are defined by the area in the reference plane 404 through which the image portion 406 is projected relative to the reference camera 400.

Figure 5:
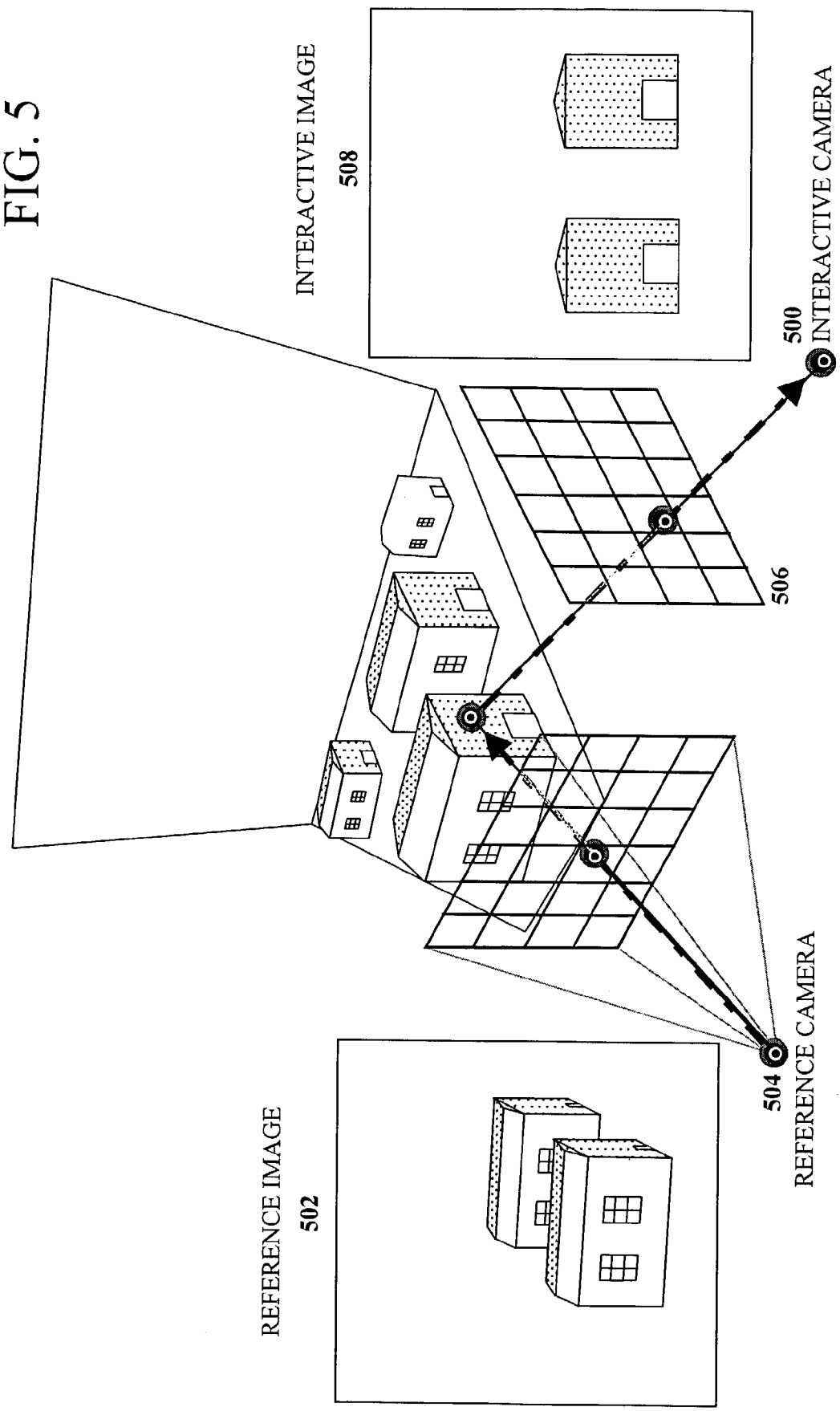
FIG. 5 is a diagram illustrating the display of an image to the user from a different vantage point in accordance with an embodiment of the invention.

FIG. 5 illustrates an interactive display component, as used in a preferred embodiment of the invention. The interactive display component permits the user to visualize the current state of the image-based representation. As the user controls the interactive camera 500, the reference image 502, stored in the representation with respect to a reference camera 504, is transformed according to the parameters of the interactive camera 500 and projected onto an interactive plane 506 defined by the interactive camera 500. This planar image is displayed as the interactive image. Thus the user is presented with an interactive image 508 from a viewpoint that differs from that of the reference image 502. This preferred method enables the user to navigate in the scene and apply editing tools from any viewing position.

This image transformation defines a mapping of points between the image planes of two cameras. In a preferred embodiment, image warping defines a mapping of points between the reference and interactive images. Forward warping, as illustrated in FIG. 5, maps points on the reference image to the interactive image, and is used to display the representation; inverse warping maps points back from the interactive image to the reference image, and is used to update the edited parts of the representation.

Figure 6:
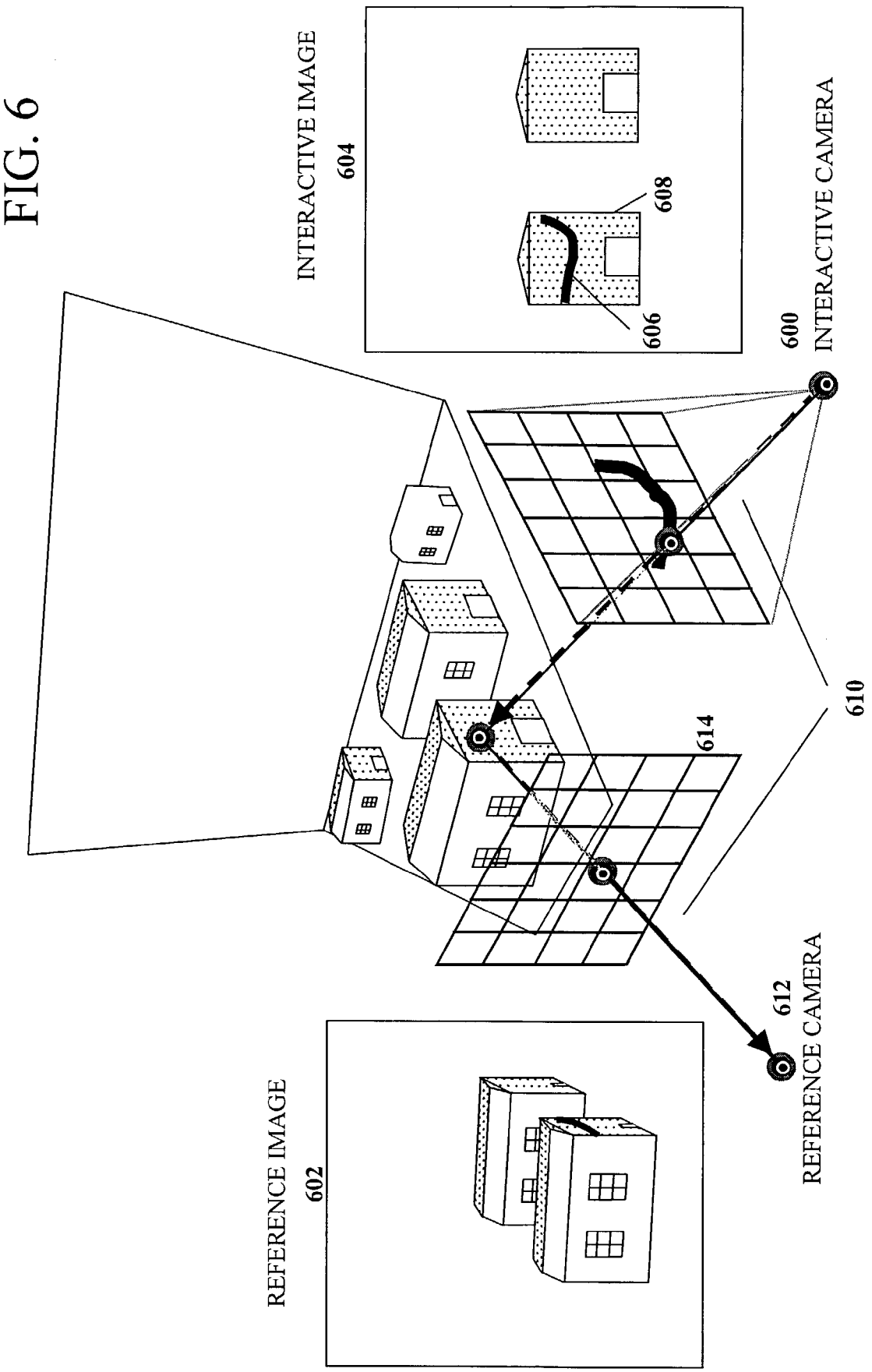
FIG. 6 is a diagram illustrating the use of inverse image warping to allow a user to interactively edit a three-dimensional image from a variable vantage point.

An example of inverse image warping is shown in FIG. 6. The process generally begins with the user specifying an interactive camera 600 and the reference image 602 being mapped via a forward image warp to an interactive image 604. This interactive image 604 is displayed to the user, who can edit the image from the viewpoint of the interactive camera 600. For example, the user may paint a squiggle 606 on the side of a house 608. The user's edit is then mapped back to the reference image 602 via an inverse image warping operation 610, where the edit is stored with respect to the reference camera 612 and reference plane 614.

In general, to warp a 3D image, two assumptions are made. First, it is assumed that the two cameras—reference and interactive—are planar-pinhole models and that their parameters are known. Second, it is assumed that the projective depth is known for the reference camera.

Projective depth information may be gathered in various ways. For instance, for real scenes, laser range scanning, stereo vision, and image-based modeling techniques may be used. For virtual scenes, depth information can be gathered by using the graphics hardware and reading the z-buffer, or by using raytracing techniques. Image warping is then used to render the new views from the viewpoint of the interactive camera by mapping the color pixels on the reference image to their corresponding coordinates on the interactive image. A system in accordance with a preferred embodiment of the invention can use a known image warping method, such as that described by McMillan in "An Image-based Approach to Three-Dimensional Computer Graphics," Ph.D. Thesis, University of North Carolina, 1997. In a preferred embodiment, image warping can be implemented based on a common industry standard such as the OpenGL API.

An implementation of image warping in a preferred embodiment of the invention can compute the splat size of a reprojected pixel. Computing the splat size is useful because the warping method may not necessarily provide information about the size of a reprojected pixel. Partial derivatives can be used to compute the splat size.

To interactively visualize the current state of the image-based representation, the interactive display utilizes the forward image-warping process—it maps the reference image to the interactive image in real time. In a system in accordance with a preferred embodiment of the invention, triangles can be used to exploit the graphics hardware. Alternatively, other image-based rendering techniques known in the art, such as splatting, can be used. Inverse image-warping is used to map the modified pixels from the interactive image to the reference image, and splatting is used to determine size of a mapped pixel on the reference image.

In a preferred embodiment, the layers of the image-based representation are displayed using triangles. A pixel is projected from the reference image to the world (i.e., three-dimensional) space, and neighboring pixels are then connected into a triangle mesh. The segmentation of the scene into layers eliminates most of the rubber-sheeting triangle artifacts, which are mainly caused by using a single mesh for a scene with multiple objects. The level of detail of the triangle mesh may be varied from layer to layer according to the user, since not all layers need to be displayed at the same level of detail. Hardware projective texture mapping may then be used to display the color channel on the triangle mesh. Projecting the 3D triangles back to the 2D interactive view is then computed and can be displayed by the OpenGL API.

The degree to which the viewpoint can be altered without artifacts is dependent on the particular scene, assigned depth, and occluded regions. In a system in accordance a preferred embodiment of the present invention, the user can specify whether each layer is visible or invisible, and the layers can be displayed according to the order list, similar to photo-editing systems, e.g., a layer is in front if it is first in the order list.

Figure 7:
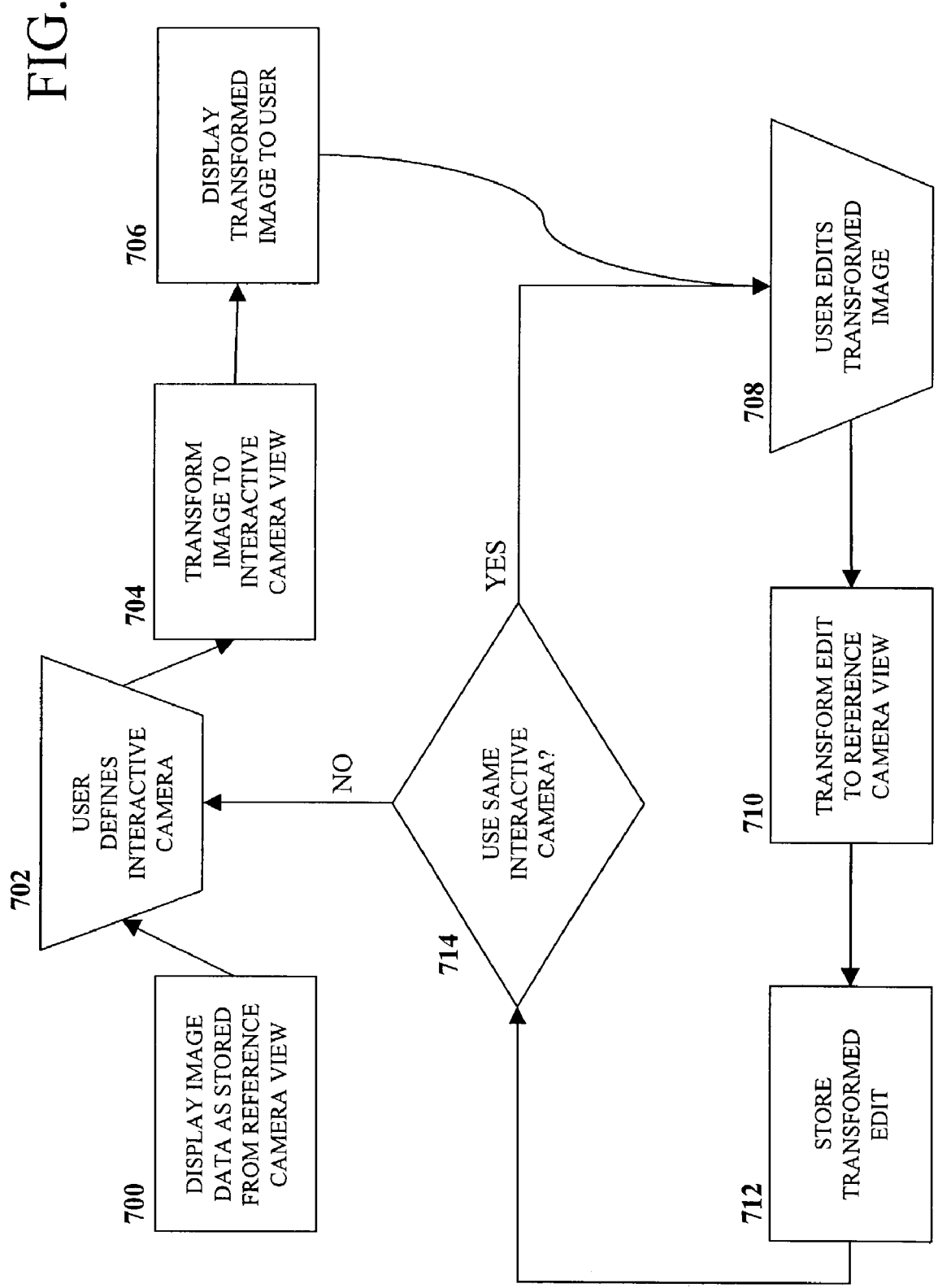
FIG. 7 is a flow diagram of a process to apply inverse image warping for the editing of a three-dimensional image in accordance with an embodiment of the invention.

FIG. 7 illustrates a general method of using inverse image warping to edit a 3D image, in accordance with a preferred embodiment of the invention. The image is initially displayed from a viewpoint of a reference camera in a display step 700. A user then defines an interactive camera, from which the image is to be viewed and edited, in a camera definition step 702. The image is then transformed by, for example, previously described methods in a transformation step 704. This transformed image is then displayed to the user in a display step 706. The user can then edit the transformed image in an editing step 708. An edit made by the user from the interactive camera viewpoint is then transformed to the reference camera viewpoint in an inverse transformation step 710. This transformed edit is then stored in the data structure representing the image in a storage step 712. The user can then decide in a decision step 714 whether to continue editing from the current interactive camera or to define a new interactive camera. A new interactive camera can be defined by repeating steps 702–706. Additional edits may be performed by repeating steps 708 through 712.

Figure 8:
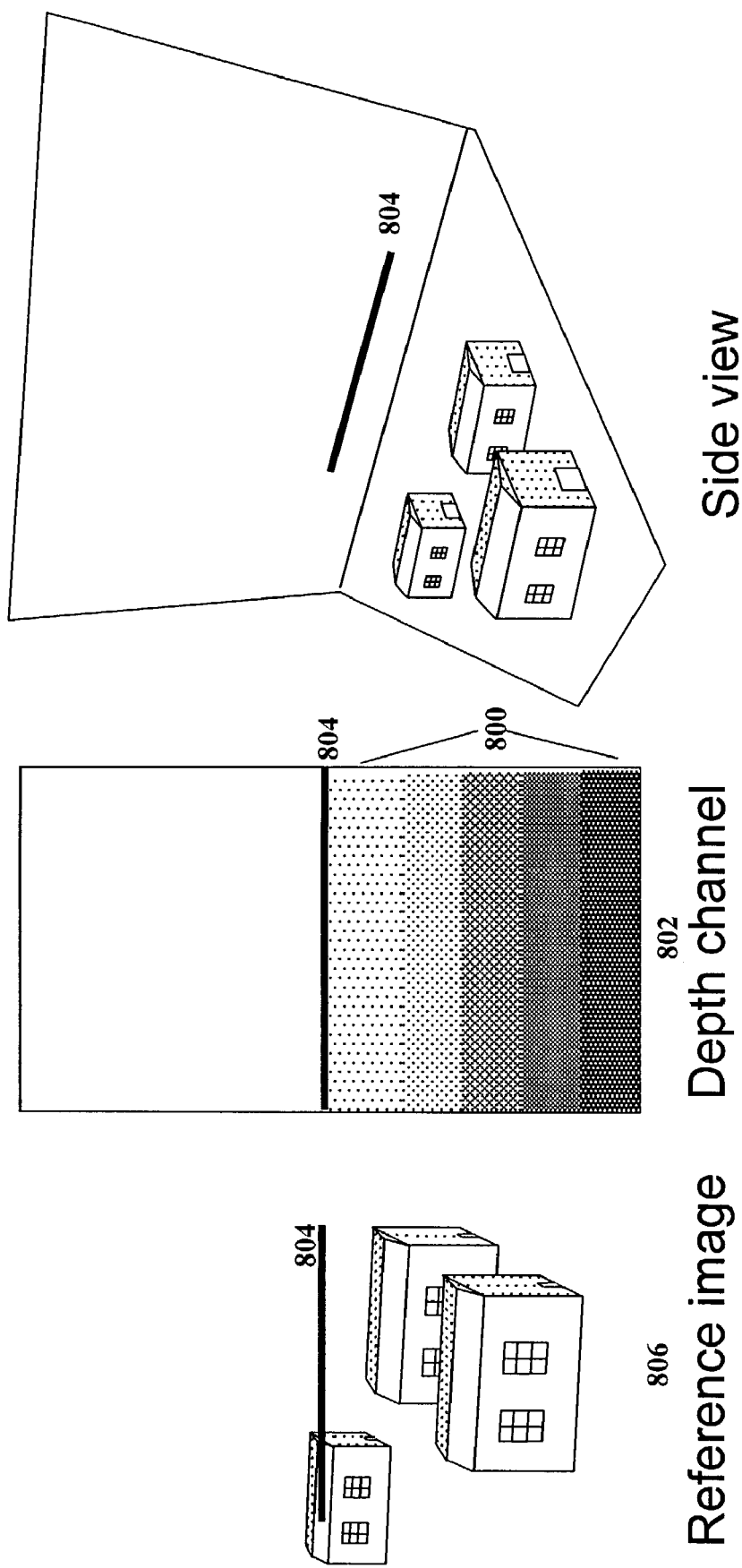
FIG. 8 is a diagram illustrating the use of an interactive ground plane tool to reference depth information in accordance with an embodiment of the invention.

FIG. 8 illustrates a ground plane tool, used in designating a reference ground plane for depth assignment in a preferred embodiment of the invention. Similar to the perspective technique used since the Renaissance, use of a reference ground plane greatly simplifies depth acquisition and improves accuracy dramatically, since it provides an intuitive reference. The position with respect to the ground plane is a very effective depth cue. Thus, specifying a ground plane is typically the first step of depth assignment.

The ground plane tool can be seen as the application of a gradient 800 on the depth channel 802. However, an arbitrary gradient 800 may not correspond to a planar surface. In a preferred embodiment of the invention, the user specifies a horizon line 804 in the reference image 806, which constrains two degrees of freedom, corresponding to a set of parallel planes. The remaining degree of freedom corresponds to an arbitrary global scale factor on depth (for example, one depth unit=30.75 feet). This degree of freedom is constrained by an observation height (i.e., the height of the reference camera relative to the ground plane), which may be arbitrarily set by the system, or the user can specify a value.

Alternatively, methods such as those described in "Creating architectural models from images," by Liebowitz, et al. in Proceedings of Eurographics, 1999, can be used. This method allows the acquisition of architectural models and camera parameters from one image using parallelism and orthogonality constraints. This provides both the camera parameters and an accurate reference ground plane. This also allows us to compute the position of the optical axis if it is not in the center of the image.

Once the ground plane has been identified, depth picking and depth painting can be used to depth-paint billboards (i.e., 2D planar surfaces extending up from the ground plane) parallel to the image plane. Since most objects in a scene touch the ground, or their projection on the ground can be inferred by the user, this can be very efficient. A preferred embodiment of the invention has the advantage of allowing a representation to be refined by the addition and editing of billboards, and by doing so from any interactive camera. Arbitrary shapes can be obtained. The invention is thus not limited to a central perspective and polygonal orthogonal objects.

A preferred embodiment of the invention allows the user to paint the depth of arbitrary vertical objects, as shown in FIG. 9. Because depth is defined in terms of a reference camera, applying depth painting tools only affects the depth relative to the corresponding reference camera. The contact or projection 900 of the object on the ground plane 902 is drawn, and a vertical depth 904 is extruded. In a preferred embodiment of the invention, the contact drawn by the user is represented as a polyline, the corresponding vertical polygons are rendered using a known rendering technology, such as OpenGL, and the z-buffer is read to update the depth information for the selected pixels.

The invention is not limited to the use of a planar ground reference. The 3D locations of the points of the contact polyline drawn by the user are read from the interactive z-buffer. This means that if the ground has been chiseled or translated for better terrain modeling, vertical objects will be extruded accordingly.

Alternatively, an embodiment of the invention can implement automatic techniques that process an entire selection or layer at once. These techniques assume that the layer or selection is in contact with the ground reference at its lowest pixels. Each column of pixels in the reference image is assigned a depth corresponding to its lowest visible or selected pixel.

Figure 10:
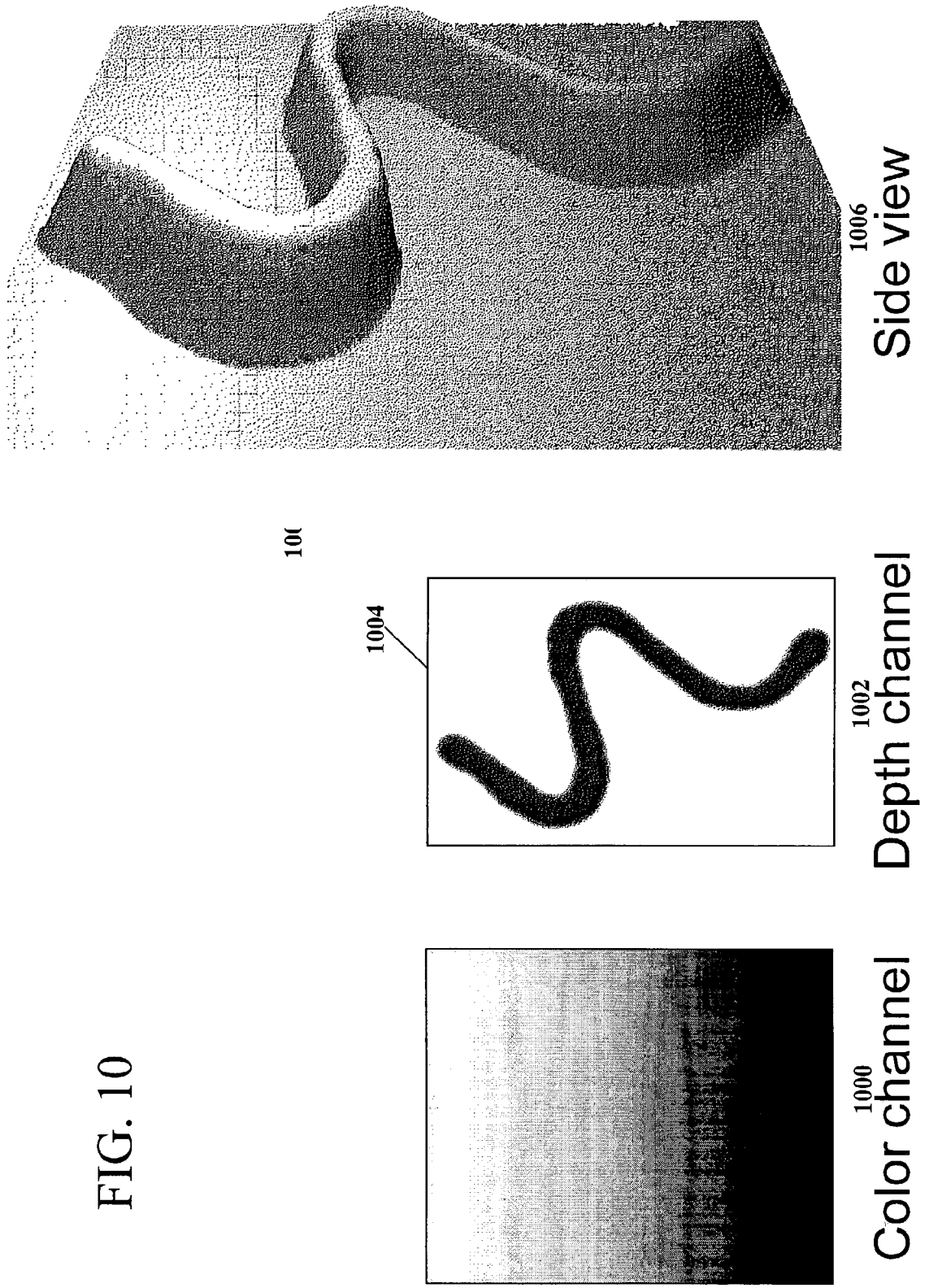
FIG. 10 is a diagram illustrating the use of a painting tool to assign depth information in accordance with an embodiment of the invention.

FIG. 10 illustrates an application of a depth painting tool in accordance with a preferred embodiment of the invention. The user can directly paint depth using a brush, either setting the absolute depth value or adding to or subtracting from the current value (chiseling). Absolute depth can be specified using a tool similar to a color picker tool used in standard 2D image editing software, permitting the absolute depth to be specified by clicking on a point of the image to read its depth. In the example of FIG. 10, the separate color channels 1000 and depth channel 1002 are shown. The user has used a brush type tool to paint a squiggle 1004 on the depth channel 1002. When the image is displayed from an interactive view 1006, the squiggle 1008 is clearly seen to have a different depth than the rest of image. The depth painting brush used in this example is not particularly soft, so there appears to be a very steep grade between the squiggle 1008 and the regions of the image that have not been depth-painted. In a preferred embodiment of the invention, the size and softness of the brush can be interactively varied. Additionally, a relative brush tool, used to set depth of a portion of the image relative to the depth of another portion of the image, may be used to refine already-assigned depth.

In addition to using brushes to control depth, an entire selected region can also be interactively translated in depth. Translation is performed along lines of sight with respect to the reference camera: the depth of each selected pixel is incremented or decremented. Because it is desirable that planar objects remain planar under this transformation, instead of adding or subtracting a constant value, depth may be multiplied by a constant value. This permits depth-translating of planar objects to result in parallel planar objects.

A preferred embodiment of the invention contains local blurring and sharpening tools that filter the depth channel under the pointer, rather than filtering the color channels, as would be in standard 2D tools. Blurring smoothes the shape, while sharpening accentuates relief. Local blurring can be used to soften depth discontinuities. Global filtering of depth is also possible. In particular, blurring can be used to smooth the 3D shape, noise may be used to add complexity, and median filtering may be used to remove outliers.

In a preferred embodiment of the invention, a user can use the color channels to assign depth. This is motivated by cases where darker values correspond to more distant pixels (such as trees) or by atmospheric perspective making distant objects bluer. The user specifies the $z_{min}$ and $z_{max}$ depth values, and the vector specifying color direction $\vec{C}$ (e.g., dark to light or amount of blue), and the effect can be applied absolutely or relatively. In the absolute case, for example, depth is then determined from the color at each pixel $\vec{c}(x, y)$ by:

$$\vec{z}(x,y)=(z_{max}-z_{min})*\vec{C}\cdot\vec{c}(x,y).$$

In accordance with a preferred embodiment of the invention, geometric primitives, level sets, and 3D templates can be used to aid in the depth applying process. Some geometric shapes, such as boxes, spheres, or cylinders, are hard to depth-paint accurately. A preferred embodiment of the invention therefore uses geometric primitives that can be drawn transparently as 2D objects. For example, the user can draw a circle or click on three points to assign spherical depth. Similar interfaces for cylinders (the user draws the edges), boxes (the user draws three edges of a corner), and pyramids (the user draws the base and apex) may be used.

FIG. 11a shows an example of the use of a geometric primitive to apply a box depth to a portion of a 2D image, in accordance with a preferred embodiment of the invention. The user specifies the base of a rectangle as two connected line segments 1102. The user further specifies a height for the box as a point 1104 above the vertex of the two connected line segments 1102. The user thus defines a 3D box. Depth is then automatically applied to the image according to the box specified by the user.

FIG. 11b shows a similar example of the use of a geometric primitive to apply a pyramid depth by allowing the user to specify a base 1106 and a height 1108. In FIG. 11c, the user uses a cylindrical primitive to apply a cylinder depth by specifying a base ellipse 1110 and a height 1112.

To determine depth information, the geometric primitive can be rendered from the viewpoint of the reference camera using OpenGL, and the z-buffer is read to assign depth. This requires the use of a depth buffer at the resolution of the reference image. In a system that treats images that can be larger than the screen, tiling can be used.

Once the image projection of the primitive has been provided, its distance should be specified. The user can use an arbitrary distance and then refine it with a translation tool. The user can also use the already-assigned depth as a reference by clicking on one point. For example, the reference depth can be set by the user clicking on a corner of a box. By default, the first point clicked by the user is used as a reference depth.

To improve the quality of depth when a ground plane has been assigned, a preferred embodiment of the invention allows the user to use "primitive snapping" to enforce the verticality of boxes, cylinders or pyramids, or to constrain them along the normal of a given pixel. A least-square error minimization may then be run to optimize the 3D shape position.

A preferred embodiment of the invention employs a tool that assigns depth using level sets. In a level set, pixels that have the same relative depth are grouped and manipulated together. The level sets may be defined, for example, by the user drawing contour lines to show pixels at the same depth. A range of depth r and a gradient may then be specified to vary the depth (uniformly, for example) across the contour lines. The level set tool is well suited to giving organic shapes a bulgy appearance, by specifying more distant depth at the boundary and closer depth in the center. This tool is relative, and the range r of depth addition can be specified by the user.

In a preferred embodiment of the invention, level sets can alternatively be computed using an erosion technique in which the initial active interior of the object is defined as the set of pixels of the layer or selection with non-null alpha. The distance to the boundary $d_{bound}$ is initialized to 0, and then iterative "erosion" takes place. For each iteration, pixels that have a non-active neighbor are discarded, and the distance of active pixels is incremented by 1. Alternatively, the distance of the active pixels may be decremented by 1. The normalized distance to the centroid $d'=1-(d_{bound}/d_{bound\text{-}max})$ may be used, and depth may be updated according to $z=z+r\sqrt{1-d'^2}$. This formula was chosen because it assigns a spherical shape to a disk under orthographic projection.

Figure 12:
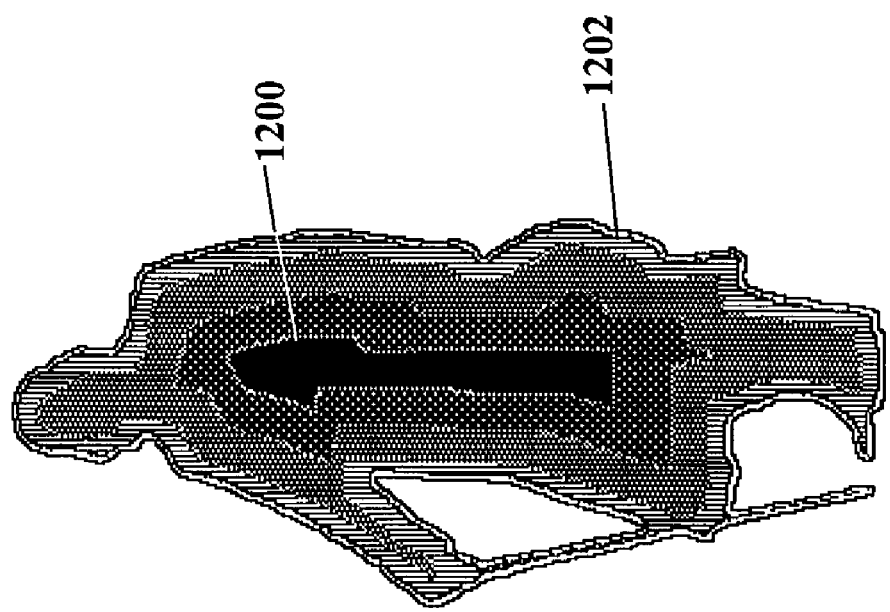
FIG. 12 is a diagram illustrating the use of a level set tool to assign depth information in accordance with an embodiment of the invention.

An exemplary application of the level set tool is shown in FIG. 12 where the original 2D image is of a statue of a man with a cane. The darker portions 1200 of the image correspond to level sets that are less deep in the image. The lighter portions 1202 of the image are at the edges, and correspond to deeper portions of the image.

For certain complex shapes, such as the human face, use of geometric primitives and level sets may not yield satisfactory results. Conforming these shapes to a pre-defined template may, however, result in good approximations of depth. This method trades accuracy and user intervention for speed and simplicity. Although the method is here described with reference to the human face, this method could be further generalized to a broader class of template shapes. In a preferred embodiment of the invention, a user places a generic arbitrary 3D face model, optimizes its 3D position to match the photograph, and then uses 2D morphing to refine the match.

Figure 13:
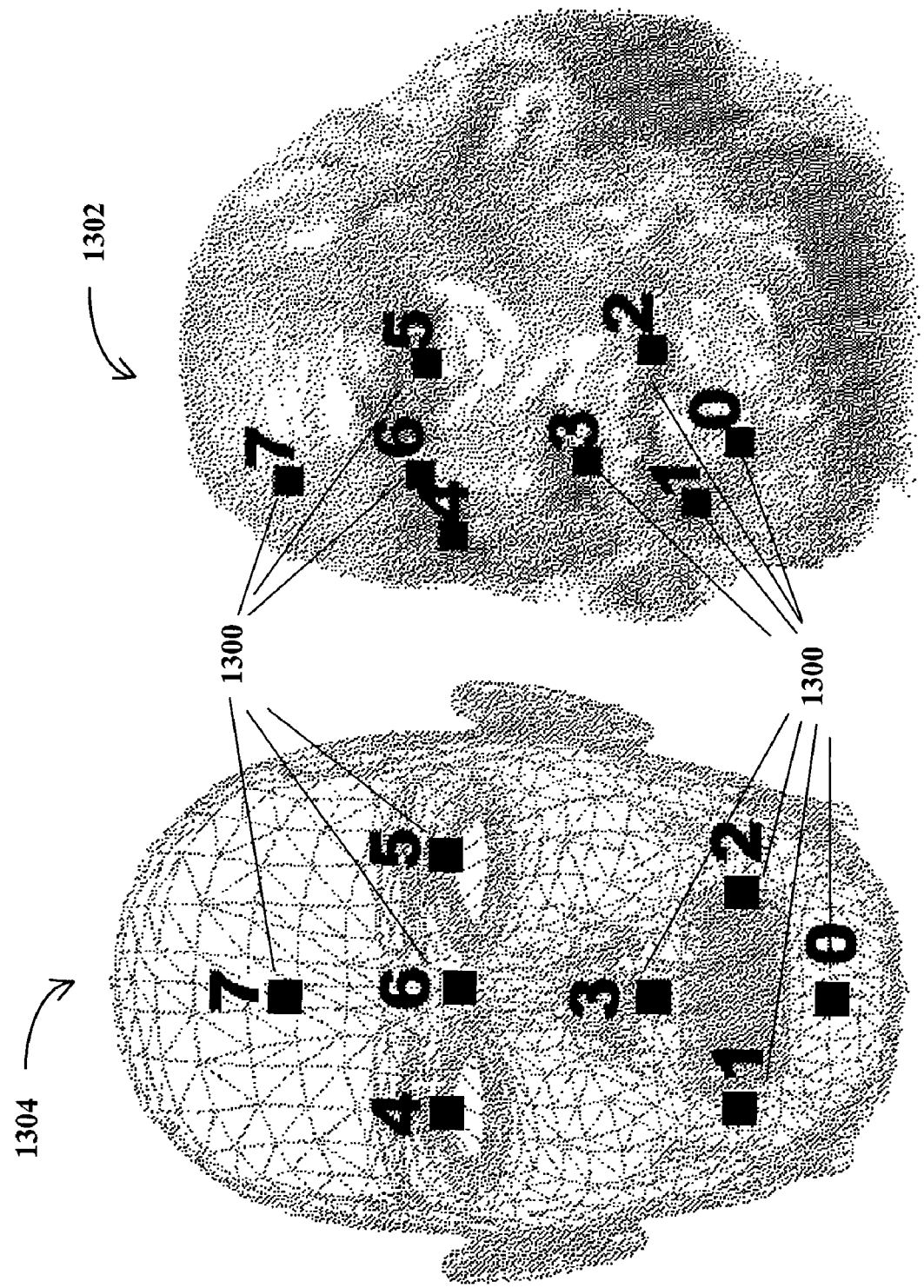
FIG. 13 is a diagram illustrating the use of a template to assign depth information in accordance with an embodiment of the invention.

With reference to FIG. 13, in a preferred embodiment of the invention, the user specifies correspondence points 1300 between the image 1302 and the 3D model 1304. These points are used to find the rotation, scale, and position of the 3D model. Rotation and scale are optimized independently to avoid shear in the resulting transformation. The 3D face is rendered, and the z-buffer is read back to determine depth. The same correspondence points are then used to morph the z-buffer and obtain a better match with the image using triangle-based morphing and linear interpolation.

In addition to tools used for assigning depth to 2D images, the present invention further comprises a non-distorted clone brushing tool for copying portions of 2D representation to another, consistent with depth, texture, lighting, and other image information. FIG. 14 illustrates exemplary problems associated with the use of a traditional 2D clone brush tool on a representation of a 3D scene. In 2D photo editing systems, the clone brush, also known as the "clone stamp," is one of the most powerful and widely-used tools. The clone brush permits interactively copying and pasting from one region of an image to another via a brush interface. It is often used to remove undesirable portions of an image, such as blemishes or distracting objects in the background, or to replicate parts of a photograph. The brush interface facilitates fine user control, and interactively copying and pasting existing pixels enables the user to maintain photorealism even with drastic modifications.

Despite its utility and versatility, a standard 2D clone brush suffers from several important limitations when used with a 3D image. First, only regions with similar orientation and distance with respect to the camera can be brushed effectively. Perspective foreshortening present in most photographs, and various shapes of the objects in the scene make it difficult to clone brush effectively, as illustrated in FIG. 14. Although the traditional clone brush works well for regions of the image that do not have a strong geometric structure, such as clouds or vegetation, many structured features are not amenable for the traditional clone brush due to perspective foreshortening, such as buildings.

Figure 14A:
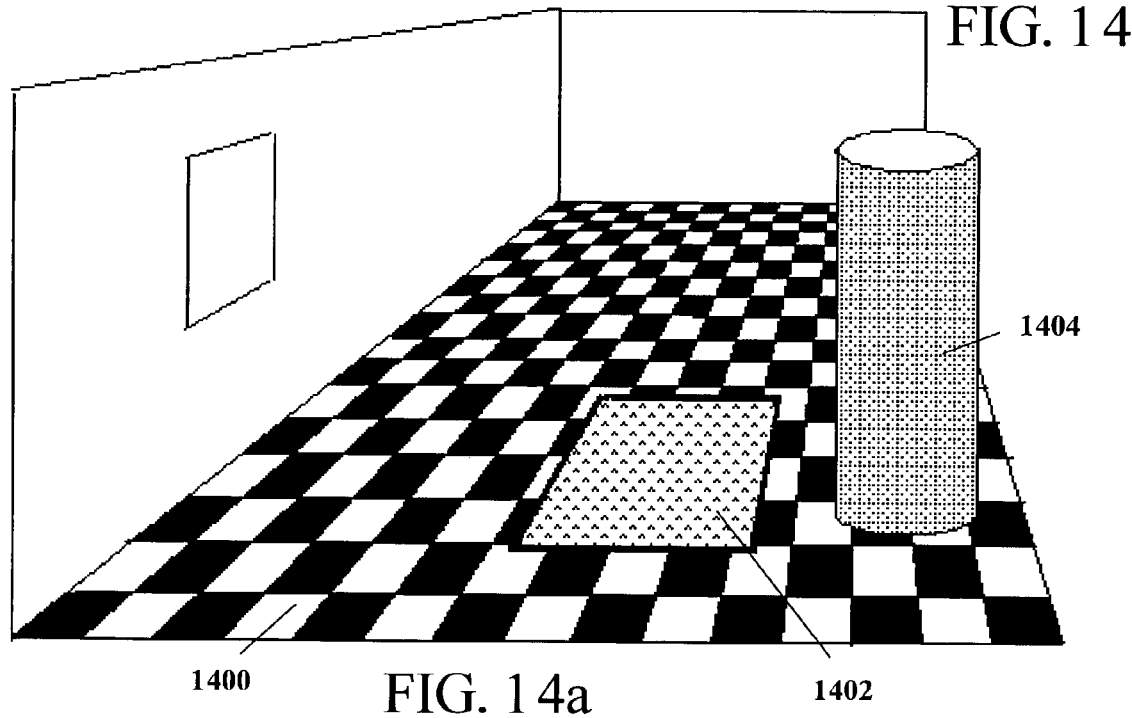
FIG. 14 is a diagram illustrating problems encountered by the use of a traditional 2D clone brush tool.
Figure 14B:
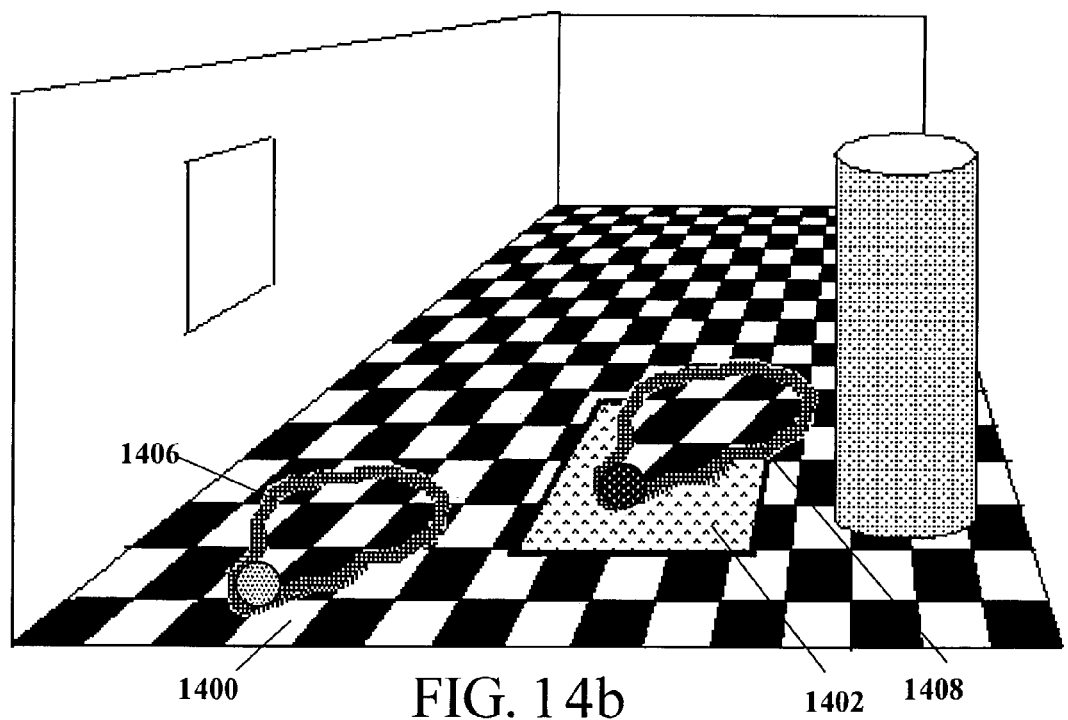

FIG. 14a shows a 2D representation of a 3D image that includes a checkerboard floor 1400, a rug 1402, and a column 1404. In FIG. 14b, a traditional 2D clone brush is used in an attempt to remove the rug 1402 from the floor 1400, by copying from a source region 1406 to a destination region 1408. Clone brushing to remove the rug is difficult, due to the perspective foreshortening on the floor pattern.

An additional difficulty associated with using the traditional 2D clone brush in a 3D image is caused by intensity variations due to existing lighting in the photograph. This further limits the effectiveness of the clone brush. Artifacts appear when the intensity of the source and destination regions do not match. Only regions with similar intensities can be clone brushed convincingly using the traditional clone brush.

Figure 14C:
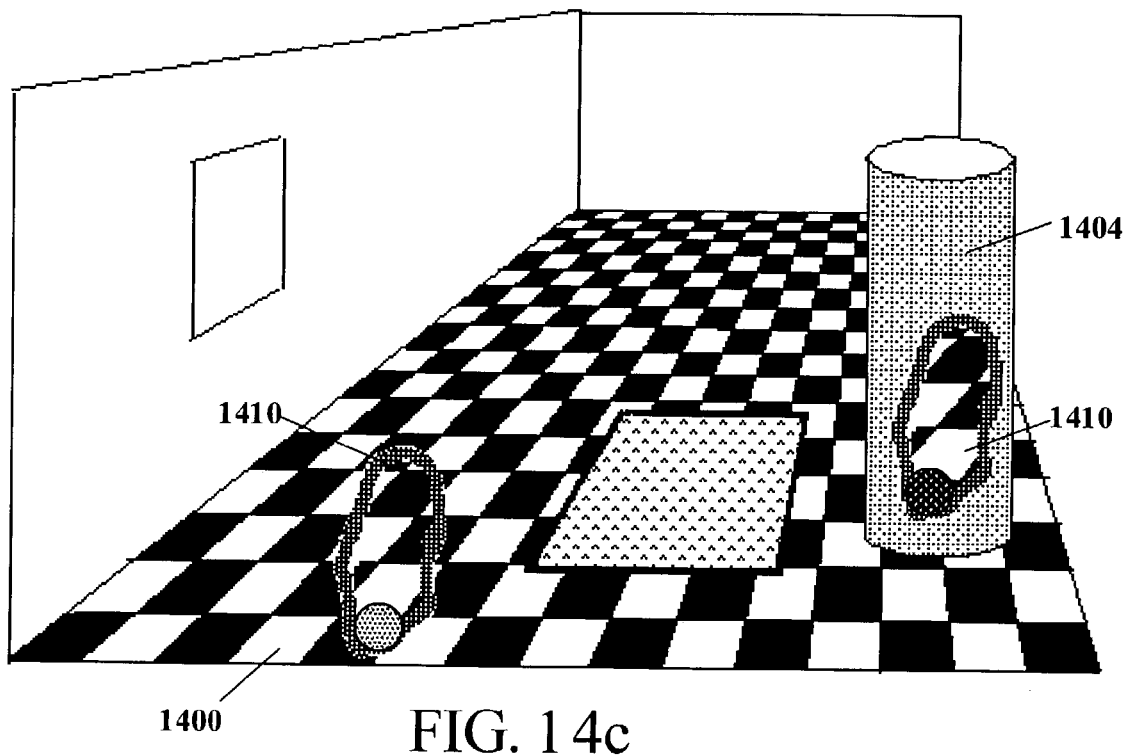
Figure 14D:
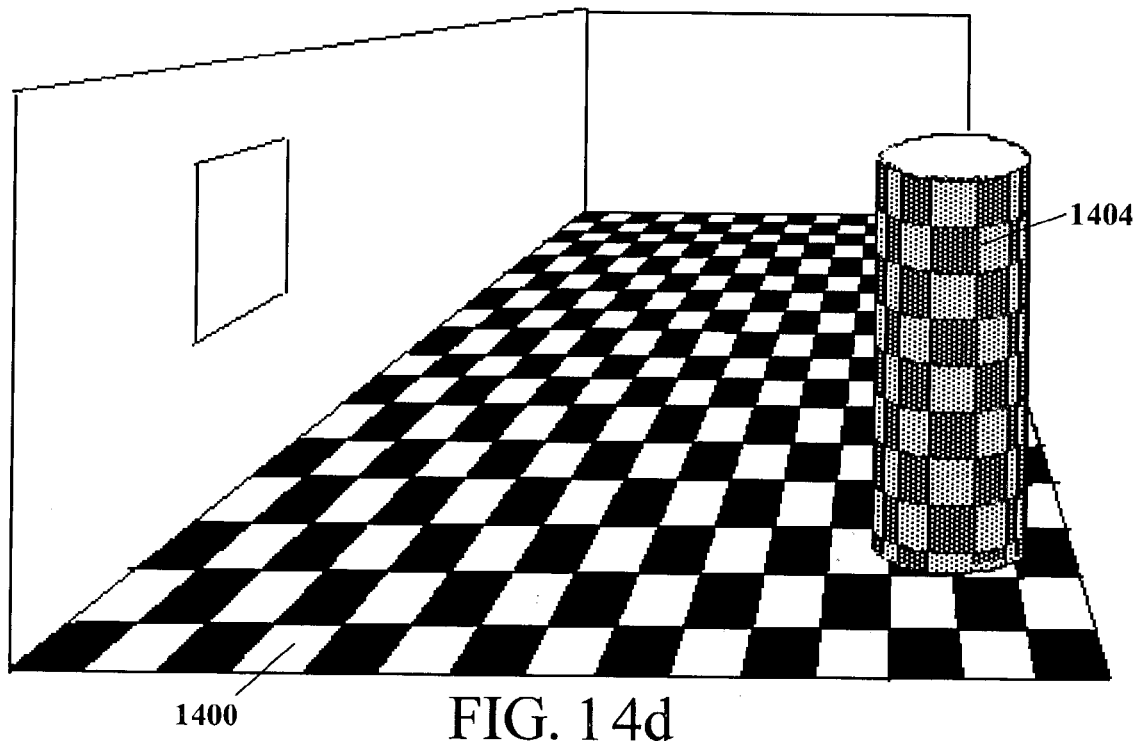

In FIG. 14c, a traditional 2D clone brush is used to add color from the floor 1400 to the column 1404 by copying from a source region 1410 to a destination region 1412. Clone brushing the column is difficult due not only to perspective foreshortening, but also to texture distortion and lighting variations. The desired effect of applying the clone brush is seen in FIG. 14d, where the perspective foreshortening of the floor pattern 1400 has been corrected, and the texture of the column 1404 has been maintained.

Traditionally, to use a clone brush, a user first selects a source region of the image and then paints over a destination region using a brush interface that copy-pastes pixels from the source to the destination. In a typical use of a clone brush tool, the user "paints" the destination region with the clone brush by moving a cursor on the display. The "paint" applied by the clone brush are pixels from the corresponding portion of the source region. Precisely which pixels are copied from the source region to the destination region is determined by a relative translation. The relative translation is defined between a point s in the source region and a point d in the destination region. For any point d' in the destination region, the clone brush will copy point s' from the source region such that the positional relationship between s and s' is equivalent to the relationship between d and d'.

In more detail, the user selects the initial source and destination points, s and d respectively, to define the relative translation, $T_r$, computed in the image plane. As the clone brushing progresses, $T_r$ determines the position of the source region with respect to the currently-being brushed destination region. The equation to determine the location of the source pixel, $x_s$, relative to the current destination pixel, $x_d$, is $x_s=T_r x_d$. The color of pixel $x_s$ is then copied to the pixel $x_d$. A more general formulation of this equation is $x_s=M_r x_d$. The matrix $M_r$ is a similarity transformation matrix, where $M_r=T_r R_r S_r$. $T_r$ is the relative translation, $R_r$ is the relative rotation, and $S_r$ is the relative uniform scaling that would allow the user to clone brush rotated and scaled pixels from the source to the destination region in the image plane. This feature is not available in traditional photo-editing software, but is enabled in a preferred embodiment of the invention.

A preferred embodiment of the invention makes use of depth information of the image to correct distortion due to both perspective (i.e., foreshortening) and surface shape. In the general case of arbitrary geometry, the problem is similar to low-distortion texture mapping in that the goal is to map the pixel color from source region of the image-based representation to the destination, with as little distortion as possible. A preferred embodiment of the invention achieves this goal by computing a (u,v) texture parameterization for both the source and destination regions that conforms to the shape of the geometry, and uses this mapping for the clone brush, as described below, and shown in FIG. 15.

Figure 15:
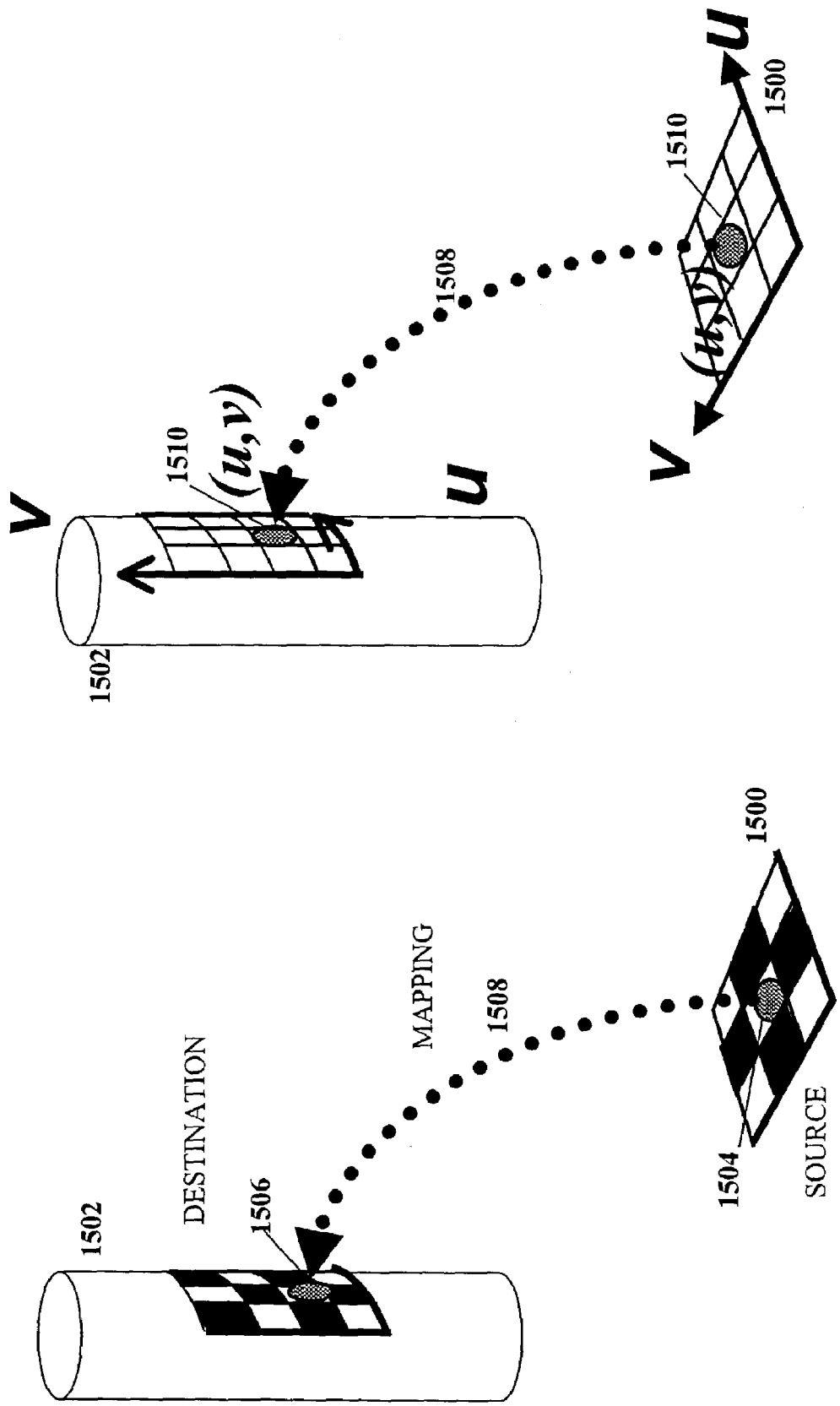

Furthermore, a preferred embodiment of the invention overcomes known limitations by running in real-time and not requiring special conditions for coping with region boundaries. Such a preferred embodiment works in an interactive context by parameterizing and expanding in real-time only the necessary parts of the image around the source and destination regions, and by using a non-distorted texture mapping technique to conform the parameterization to the underlying geometry. Parameterization and optimization only take place locally around the clone brushed region, where the region is "flood-filled" and initialized with parameters that are already close to the solution. This initialization step quickly converges the optimization process to its solution FIGS. 15 and 16 provide an intuitive overview of the non-distorted clone brushing process in accordance with a preferred embodiment of the invention. In this example, the user clone brushes from the ground plane 1500 to the cylindrical column 1502. Similar to the traditional clone brush, the user first selects the initial source point 1504 and destination point 1506. The initial source and destination points are parameterized as $(u_0, v_0) = (0,0)$. A mapping 1508 will copy points (u,v) 1510 from the ground plane 1500 relative to the source 1504 onto the corresponding projection 1512 on the cylinder 1502.

FIG. 16a demonstrates the process in more detail. The (u,v) parameters of a small region 1600 around the initial points have been "flood-filled" and initialized. As the user clone brushes around the destination region 1602, the parameterized region expands and is optimized accordingly. To maintain interactivity, a preferred embodiment parameterizes and optimizes only for the bounded subregion. A matching (u,v) coordinates of brushed pixels from the destination 1602 to the source 1604 is then found. FIG. 16b shows the expanded parameterization 1606 and matching (u,v) coordinates 1608 of the source region 1604 and destination region 1606. Once the destination parameters of each pixel have been mapped to the source, the pixel color from the source 1604 is copied and then placed on the destination region 1602.

Figure 17:
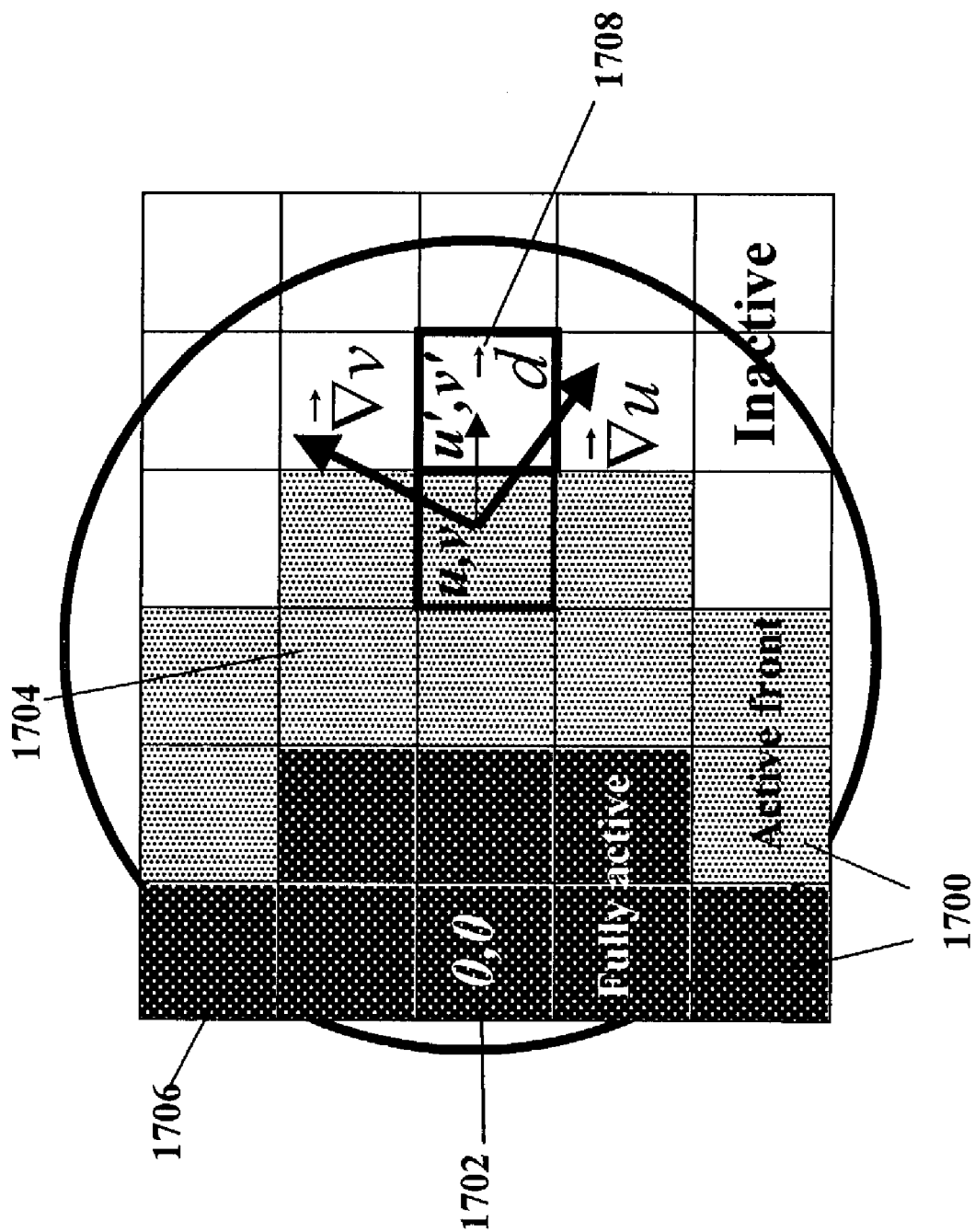
FIG. 17 is a diagram illustrating an optimization and parameterization used by a non-distorted clone brush tool in accordance with an embodiment of the invention.

FIG. 17 illustrates in greater detail the optimization of the parameterization around the current position of the clone brush, in accordance with a preferred embodiment of the invention. The parameterization for only a subset of pixels, called active pixels 1700, is computed. The active pixels 1700 are shown in light and dark gray in FIG. 17. This subset is expanded as time progresses and the user drags the brush. Although the method is here described for a single layer, it may run concurrently for both the source and destination layers. The method interleaves optimization steps, where coordinates are refined, and expansion steps, where new pixels are declared active and initialized. Moreover, coordinates of already-brushed pixels are preferably "frozen" so that those pixels are not re-used with different coordinate values in subsequent optimization iterations. To initialize the process, the first point clicked by the user is used as a seed 1702, and is assigned the coordinates (0,0) with the gradient of u, $\vec{\nabla} u$ orthogonal to the vertical direction and to the pixel normal. $\vec{\nabla} v$ is then orthogonal to $\vec{\nabla} u$. The set of pixels at the boundary of the active region is called the active front 1704. The active front is shown in lighter gray in FIG. 17. More formally, a pixel is declared in the active front if it is active and if one of its 4-neighbors has an inactive 4-neighbor. Intuitively, the active front corresponds to pixels that lack neighbors necessary to compute smoothing. Active pixels 1700 not in the active front 1704 are said to be fully active 1706. Fully active pixels 1706 are shown in darker gray in FIG. 17.

Optimizations on u and v are interleaved, and active pixels 1706 are treated as vertices of a mesh and smoothed accordingly using linear operations. Due to the absence of some neighbors, previously existing methods of discrete smooth interpolation cannot be directly used with pixels on the active front. A preferred embodiment of the present invention thus only optimizes the gradient constraints for these pixels. Selecting a good initial value for the active-front pixels ensures the stability of the process.

An expansion step in accordance with a preferred embodiment of the invention extends the active region 1700 by one pixel in the direction of the current mouse location. The active front 1704 is accordingly updated, and each new active pixel receives initial coordinate values. This is done according to its active neighbors, by using a local planar approximation of the geometry. For each neighbor 1708, the coordinates (u',v') of the new pixel are computed using the current gradients of an active neighbor, $\vec{\nabla} u$ and $\vec{\nabla} v$, and the object-space vector $\vec{d}$ between the two pixels: $(u',v')=(u+\vec{d}\cdot\vec{\nabla} u, v+\vec{d}\cdot\vec{\nabla} v)$. The average of the values computed from the active neighbors is used. This formula results in an optimal initial value, provided the geometry is planar.

A bounding rectangle may be used to expand the active regions. Since the clone brushing takes place in the destination region, expanding the active destination region may follow the user's movement of the clone brush. The active source region is expanded according to the parameter mapping of the current clone brush position in the destination region. If the current (u,v) parameters of the destination region exist outside of the current active source region, the active source region is then expanded accordingly. Because the parameterization is monotonic in the gradient directions $(\vec{\nabla} u, \vec{\nabla} v)$, it is easy to calculate if (u,v) is outside the active source region, and accordingly whether or not to expand the active source region.

The parameterization proceeds as the user interactively clone brushes. It should be faster than the speed of the brush to ensure smooth interaction. In practice, subsampling the layer may be desirable to obtain real-time feedback. Thus, in an embodiment of the invention, (u,v) values are computed every 4×4 pixels and bilinearly interpolated. This process does not take into account local bumps in the geometry, but fits the global shape.

As soon as a pixel has been clone brushed, its (u, v) coordinates are preferably frozen to avoid artifacts that would occur if the same pixel were re-used with different coordinate values due to subsequent optimization iterations.

Clone brushing a destination pixel with coordinate (u,v) involves inverting the mapping of the source image. In the general case, no pixel will have the exact (u,v) coordinates. Thus the four pixels with the nearest coordinates are used and bilinearly interpolated. Because the parameterization is monotonic, a straightforward "march" from the initial (0,0) pixel may be used to find the pixels closest to (u,v). Since a brush corresponds to a set of contiguous pixels, it suffices to compute a seed value and march from it along the gradient to find the inverse mapping of subsequent pixels.

In accordance with a preferred embodiment of the invention, once the source and destination regions have been parameterized using a non-distorted texture mapping technique that conforms to the geometry of the scene, as described above, pixel colors from the source region may be copied to the clone-brushed pixels in the destination region. In a preferred embodiment of the invention, this is accomplished by searching for the pixel, $\alpha_s$, in the source region that has the same parameter coordinates as the current pixel, $\alpha_d$, being clone brushed in the destination region, such that $\phi_s(\alpha_s)=\phi_d(\alpha_d)$, where $\phi_d(\alpha_d)=(u_d,v_d)$ is known. Finding $\alpha_s$ is thus achieved by finding an inverse mapping $\phi_s^{-1}$ to search for the pixel location given the parameterization: $\phi_s^{-1}(\phi_d(\alpha_d))$. An iterative search method that linearly approximates a function around the local region to compute the next guess, such as Newton's method, is then used to find the mapping $\phi_s^{-1}$. This may be accomplished by iteratively guessing a pixel $\alpha_s^k$ in the source region such that $\phi_s(\alpha_s^k)-\phi_d(\alpha_d)$ approaches 0. At each iteration, k=0, 1, . . . , the next pixel $\alpha_s^{k+1}=\alpha_s^k+\delta^k$ is computed, where $\delta^k$ is the step vector that is a linear approximation $\phi_s(\alpha_s^k)$.

The iterative method described above produces an exact solution in a single iteration when the geometry is planar. Any active pixel in the source region may be used as the initial position, $(\alpha_s^0)=(u_s^0,v_s^0)$. The last known brush position may be used as $(\alpha_s^0)$ since the current brush position is assumed to be close. The step vector, $\delta^k$ is computed from the local gradients, $$\nabla u_s = \left[\frac{\partial u}{\partial X}, \frac{\partial u}{\partial Y}\right] \text{ and } \nabla v_s = \left[\frac{\partial v}{\partial X}, \frac{\partial v}{\partial Y}\right],$$

and the kth iterative approximation is defined as follows:

$$\delta_X = \frac{(u_d - u_s^k)\frac{\partial v}{\partial Y} - (v_d - v_s^k)\frac{\partial u}{\partial Y}}{\frac{\partial v}{\partial X}\frac{\partial u}{\partial Y} - \frac{\partial u}{\partial X}\frac{\partial v}{\partial Y}}$$

$$\delta_Y = \frac{(u_d - u_s^k)\frac{\partial v}{\partial X} - (v_d - v_s^k)\frac{\partial u}{\partial X}}{\frac{\partial v}{\partial X}\frac{\partial u}{\partial Y} - \frac{\partial u}{\partial X}\frac{\partial v}{\partial Y}}$$

where $\delta^k=(\delta_X, \delta_Y)$.

If the parameterization $\phi_s(\alpha_s^k)$ is outside of the current active source region, then the active source region is expanded in the direction of pixel $\alpha_s^k+\delta^k$. Since the expansion process initializes and activates the not-active pixels, i.e., initializes their (u,v) parameterization values, if the source region parameterization expands to the extent of the layer, then the parameters are not found within the source layer and a default color value, black, may be returned. In general, no pixel parameterization in the source region will have the exact $(u_d,v_d)$ parameter values, such that $\phi_s(\alpha_s^k)-\phi_d(\alpha_d)=0$. The iterative process is stopped when $(u_d,v_d)$ is between the parameter values of four surrounding pixel neighbors in the source region. The final step is to compute the bilinearly-interpolated color value from the four neighboring pixels, and to copy-paste it to the destination pixel, where clone brushing is currently taking place.

The optimization as used in a preferred embodiment of the invention provides an exact solution in the case of planar geometry and provides a visually adequate solution for curved geometry. Moreover, because, in a preferred embodiment of the invention, layers are segmented by the user into different spatial objects, strong discontinuities are prevented.

Figure 18:
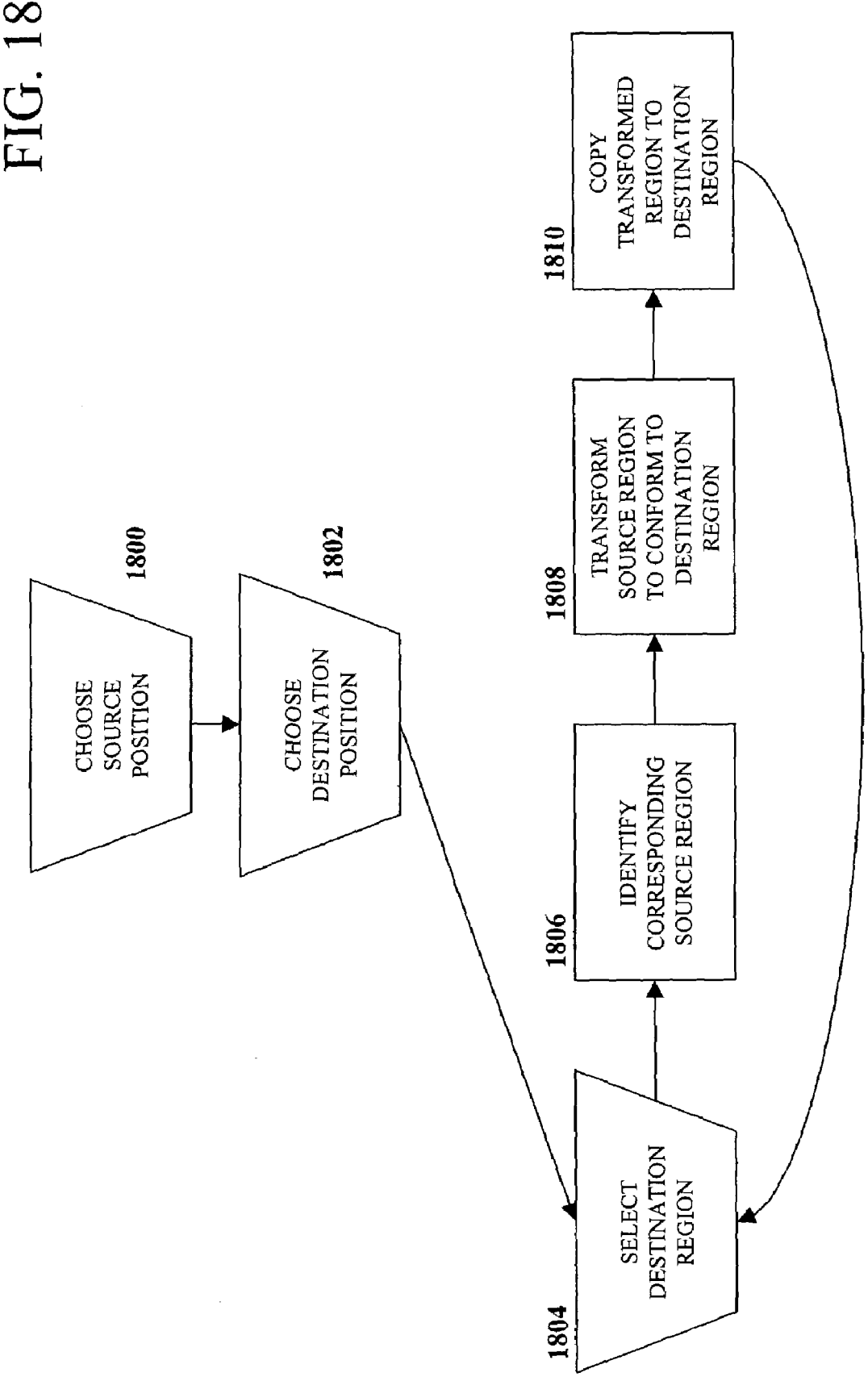
FIG. 18 is a flow diagram of a process to apply a clone brush without distortion in accordance with an embodiment of the invention.

FIG. 18 illustrates a general method of using a 3D clone brush tool, in accordance with a preferred embodiment of the invention. The process begins with the user choosing a source position in a source choosing step 1800. The user further chooses a destination position in a destination choosing step 1802. The user then selects a destination region in a destination region defining step 1804, preferably by moving a cursor generally around the destination position. The corresponding source region is then determined, preferably using methods described above, in a source region identification step 1806. The source region is then transformed to conform to the destination region in a transformation step 1808. The transformed region is then copied to the corresponding destination region in a copying step 1810. The user can continue to move the cursor to enlarge the destination region by repeating the destination region defining step 1804. Steps 1806–1810 are accordingly repeated.

A further aspect of the invention provides for the decoupling of texture and illumination information in an image. In accordance with a preferred embodiment of the invention, a technique is provided to seamlessly factor the existing lighting from the materials of the input image by decoupling these components into texture and illuminance images. Applying this method allows the user to convincingly alter and modify the existing lighting conditions or the materials in a scene.

Although there are photo-editing tools that allow the specification of pseudo-lighting effects that brighten or darken parts of a flat photograph, removing the existing illumination by previously known methods has been extremely difficult and tedious. Manually darkening highlights or brightening shadowed regions to factor out the lighting effects on the texture typically results in artifacts near the illumination discontinuities. Similarly, seamless modification of materials affected by the existing lighting conditions is challenging. Painting or applying different textures on the image results in loss of existing illumination, and manually blending in illumination effects can be time consuming and difficult for non-artists. The existing illumination conditions also limit the effectiveness of the clone brush.

Figure 19:
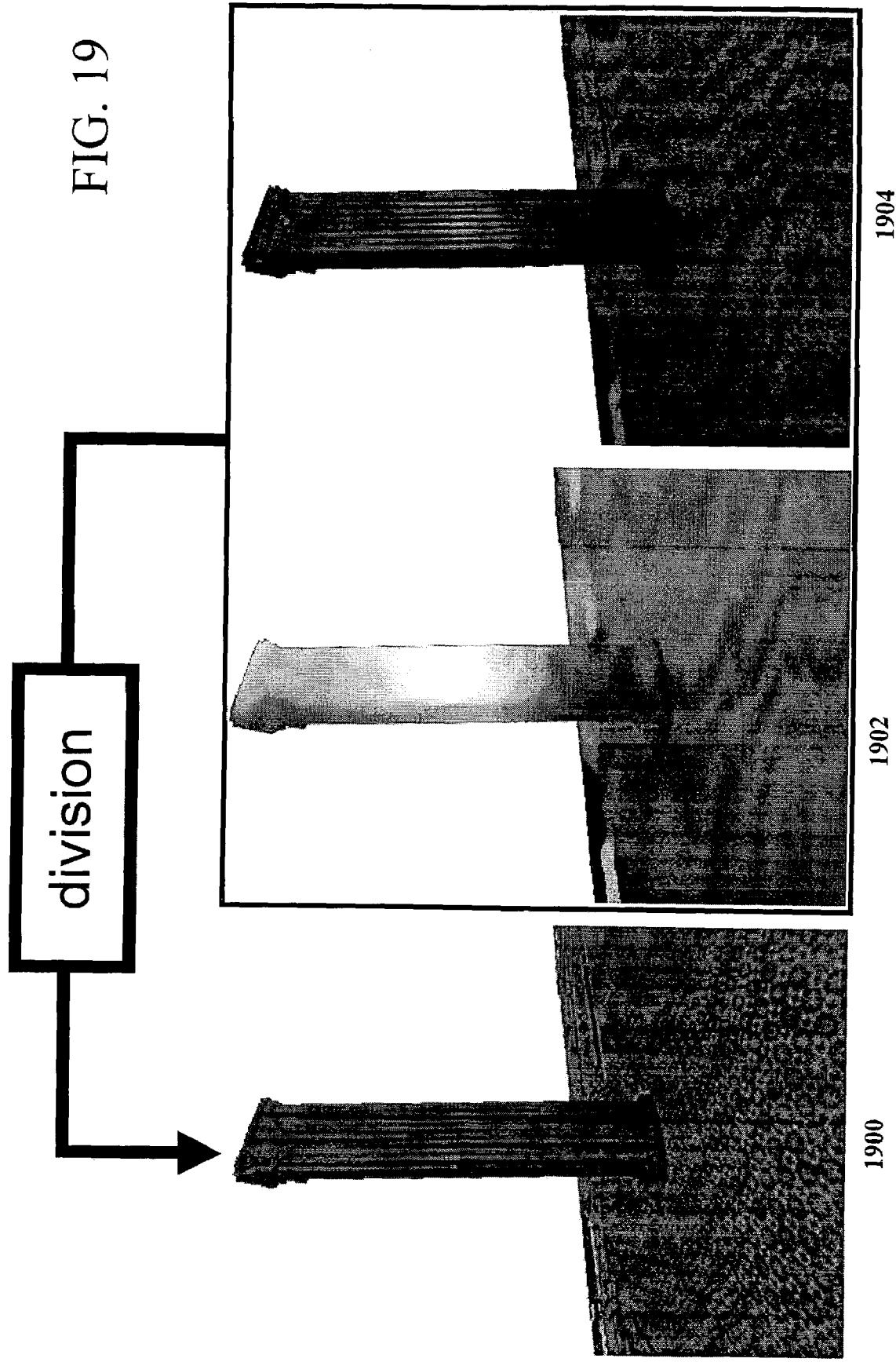
FIG. 19 is a diagram illustrating the application of texture-illuminance decoupling in accordance with an embodiment of the invention.

As seen in FIG. 19, a preferred embodiment of the invention includes a texture-illuminance decoupling filter that attempts to separates the intrinsic "texture" channels 1900 and environmental "illuminance" channels 1902 from the input image 1904. The decoupled channels are not physically-based texture or illuminance values, but the filter is easy to implement, and provides rapid and visually convincing results that are easy to edit. It is a non-linear image-processing filter that decouples the lighting effects from uniformly textured images, and thus enables the user to easily edit either the materials or the lighting characteristics of the input image. Multiplying the two separated channels results in the original input image 1904. Applying lighting effects on the illuminance channel 1902 modifies the illumination of the input image, while maintaining the existing materials; editing the texture channel 1900 changes the materials in the scene, while maintaining the existing illumination 1902. Clone brushing on the uniform texture channel 1900 works well, since the illumination effects are now separated.

Although previously known techniques are capable of relighting or rendering synthetic objects into real scenes, they are impractical in the context of interactive user systems for several reasons. First, recovering accurate geometry, light source positions, and the camera pose from photographs of arbitrary scenes is difficult and time consuming. Image-based modeling systems have been implemented and are available, but recovering complex geometry, such as people, plants, and non-rectilinear and curved geometric objects, using these systems can prove challenging. Second, applying an inverse lighting simulation is not only a difficult implementation task, but also time consuming and difficult to validate. It also requires full geometric information (360 degrees around, 180 degrees up-and-down) of the captured environment to compute the direct and indirect lighting. Furthermore, in many real-world scenes, the geometry and lighting may be too complex to estimate accurately. Inverse simulations require not only precise geometric modeling, but also precise modeling of the light sources, i.e., their distribution, color, intensity, and geometry. The accuracy of the recovered reflectance depends on the precision of the modeled geometry, light sources, and the recovered camera pose. Finally, at lighting discontinuities, e.g., shadow or highlight boundaries, artifacts can occur due to a series of possible errors—from camera misregistration to geometry approximations. If there are sharp highlights or shadows present in the scene, the precision of the predetermined information is paramount to correctly separating the reflectance from the illumination.

In contrast, the filter used in a preferred embodiment of the present invention requires far less preprocessing time, and produces visually convincing results much more rapidly, without requiring full knowledge of the environment-even with a single photograph. Thus, physical accuracy is traded for fast, intuitive, and visually convincing results.

To decouple the texture and illuminance channels from the input color channel in a preferred embodiment of the invention, the following simple assumption is made: large-scale illuminance variations are due to the lighting, which changes slowly over a surface; small-scale details are due to the texture, which varies more rapidly.

Previously known methods of texture-illuminance decoupling use a low-pass Gaussian filter to blur the initial input image to obtain the illuminance channel, and then separate the texture channel from the initial and illuminance images. A low-pass Gaussian filter may make use of a specified "feature size" that determines the degree of filtering (e.g., a larger feature size leads to more image blurring). After applying such a low-pass Gaussian filter, only large-scale illuminance variations remain, and a uniform texture component is then factored out by dividing the initial image by the blurred image.

However, a straightforward application of a low-pass Gaussian filter applies the same radially-symmetric convolution kernel throughout the pixels to blur the image, since it does not have the geometry information to take the depicted 3D scene into consideration. This shortcoming of previously known methods is illustrated in FIG. 20a. Although pixel $p_2$ 2000 is "further away" than $p_1$ 2002, their respective kernels 2004 and 2006 have the same shape and size. This results in pixel $p_2$ 2000 being blurred more than the specified feature size. Likewise, pixel $p_3$ 2004 has a different orientation than $p_1$ 2002, but their respective kernels 2008 and 2006 have the same shape and size. This results in an incorrect blurring for pixel $p_3$ 2004. As shown in FIG. 20b, it is desirable for the kernel shape of the filter and the kernel size to conform to the orientation of the geometry, as well as to compensate for the perspective foreshortening.

In accordance with a preferred embodiment of the invention, a method is given to decouple texture and illumination information from a 3D image while accounting for depth and geometry orientations. The process preferably begins with the user specifying a feature size of the texture by dragging a line segment over a pattern. The feature size determines the degree of low-pass filtering applied to the image—a large feature size blurs the image more, and vice versa. Directly specifying the feature size in the image to separate the large- and small-scale features provides an intuitive control of the filter.

In accordance with a preferred embodiment of the invention, the image's depth channel and normals are used to scale the size of the kernel to handle foreshortening and to compute an elliptical kernel shape for handling orientation. The user preferably specifies a feature size at the reference pixel $p_{ref}$, with depth $z_{ref}$. The spatial kernel size for other pixels is then scaled by $z_{ref}/z$. To compensate for orientation, a locally-planar approximation of the surface is used: Gaussian ellipses orthogonally oriented to the surface normal. The normals are computed from the neighboring pixels in world space.

Figure 21:
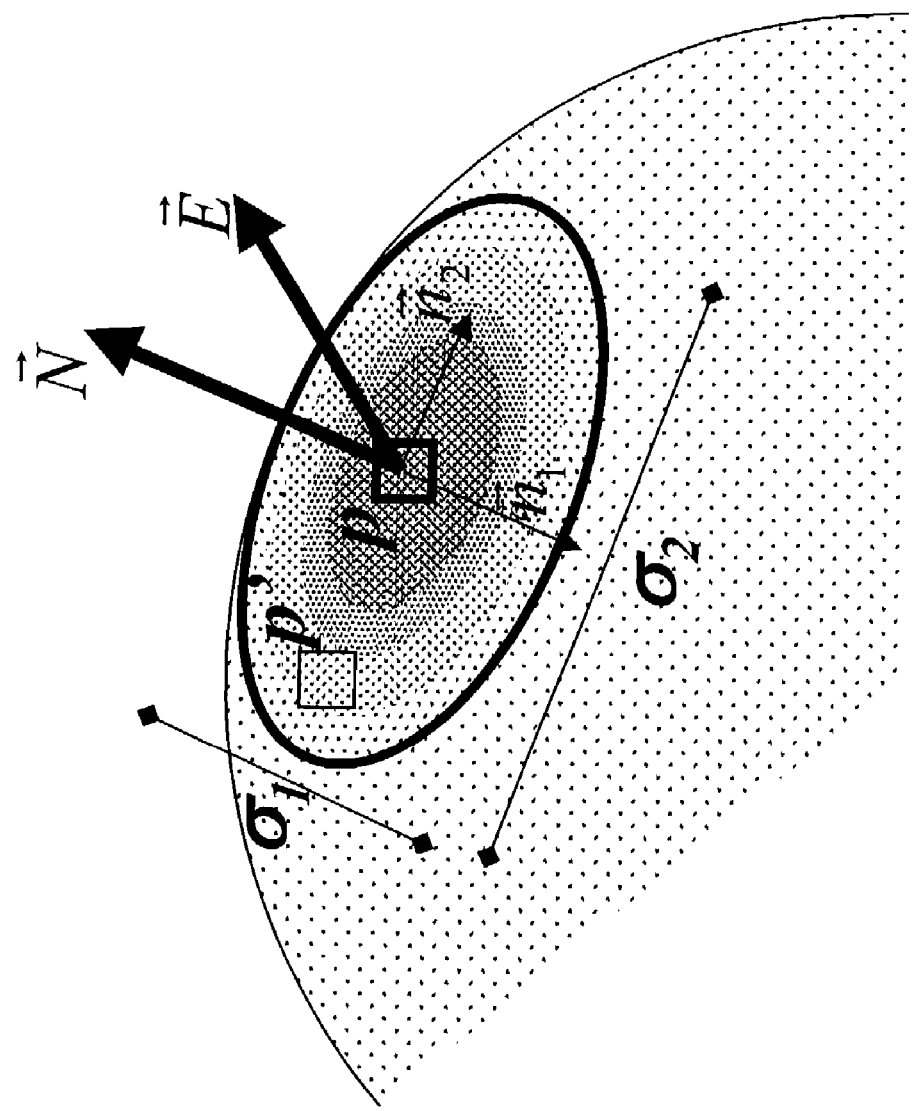
FIG. 21 is a diagram illustrating orientation correction of a spatial Gaussian in accordance with an embodiment of the invention.

As shown in FIG. 21, $\vec{N}$ is the unit normal and $\vec{E}$ the unit viewing direction in world space. The small axis of the ellipse is along $\vec{n}_1$, which is a 2D unit vector of $\vec{N}$ projected onto the image plane. Vector $\vec{n}_2$ is the long axis of the ellipse, which is a unit vector orthogonal to $\vec{n}_1$. The small-to-large ratio $$\frac{\sigma_2}{\sigma_1}$$

is given by the dot product $\vec{N} \cdot \vec{E}$, where $$\sigma_1 = \frac{z_{ref}}{z(p)} \sigma_{spatial},$$

where $\sigma_{spatial}$ is preferably set to equal the feature size. We then have $$K_{spatial}(p', p, \sigma_{spatial}) = G(\vec{pp'} \cdot \vec{n}, \sigma_2) G(\vec{pp'} \cdot \vec{\alpha}, \sigma_1).$$

The Gaussian function in the spatial domain, $K_{spatial}$, now compensates for perspective foreshortening by scaling its kernel size according to $z_{ref}$, and handles surface orientation using the ellipse.

In accordance with a preferred embodiment of the invention, a method is provided to deal with haloing artifacts that occur at lighting discontinuities. If sharp illumination discontinuities, such as shadow boundaries, are present in the input image, the simple assumption that large-scale variations are due to lighting while small-scale variations are due to texture may introduce frequencies that are in the scale of the feature size, and may be incorrectly decoupled as the texture channel. A preferred embodiment of the invention therefore makes use of a non-linear edge preserving filter to address this problem. A preferred non-linear edge preserving filter is a bilateral filter. The general idea of the bilateral filter is to not only consider the geometric closeness of a Gaussian kernel in the spatial domain, but also the similarity in the intensity domain. Therefore, the Gaussian kernel considers the product of the spatial and intensity domains, which forms the total kernel.

A preferred embodiment of the invention adapts the standard bilateral filter for the purpose of decoupling texture and illuminance channels by using iterations to always filter the initial image $I_0$, as follows:

$$I_{i+1}(P) = \frac{\sum_{p'} K(p',p) I_0(p')}{\sum_{p'} K(p',p)}$$

where $$K(p',p) = K_{spatial}(p',p,\sigma_{spatial}) G_{range}(I_i(p), I_i(p'), \sigma_{range}).$$

The initial Gaussian estimate of the illuminance, $I_1$, is used to drive the intensity Gaussian. Because the convolution kernel averages only pixels of similar estimated illuminance, the filter captures shadow boundaries. The process converges quickly, and $I_3$ is used as the final illuminance estimate. The only hard-coded parameter is the variance of the intensity Gaussian. Empirical analysis shows that $\sigma_{range} = 0.01 \max(I_1)$ provides good results.

The texture-illuminance decoupling filter as described above provides several advantages over previously known methods. First, because it is a non-linear image processing filter, the filter does not require precise fully-enclosed 3D geometry or the light source information. In many applications, this is an advantage since it does not require the costly preprocessing time and effort. Second, the filter is easy to implement, and it is much faster than physically-based inverse simulation. It produces visually convincing results, and does not employ optimization techniques that may not converge. Third, it handles the haloing artifacts that occur at shadow boundaries via the edge-preserving filter. Finally, the two images produced by the decoupling filter are easy to edit, either to modify the lighting or the material.

The filter can easily be extended to a purely 2D photo-editing context. The equations above can be used without the depth correction, and the user can assign more weight to the intensity Gaussian for finer control. An embodiment of the invention can also provide an interface such that the user can interactively specify the normals and the contours on the 2D image to approximate the depth correction.

In some embodiments, an additional Gaussian can be used in the depth domain:

$$I_{j+1}(p) = \frac{1}{k(p)} \int_0^\infty G_{spatial}(p,p',\sigma_s) G_i(I_j(p), I_j(p')) G_{depth}(N(p), N(p')) I_0(p') \, dp'$$

where $G_{depth}$ is the depth Gaussian and $N(p)$ is the normal. The local geometry around pixel p is linearly approximated using its normal, and it is also assumed that pixels $p_0$ in the kernel have the same geometry. By adding an additional Gaussian to adjust for the difference in geometry at pixels p and $p_0$, the filter can be further improved, especially for scenes with curved geometry.

In some embodiments the texture-illuminance decoupling can be generalized to non-uniform textures, in an automatic fashion. The tone and the local texture of an image can then be edited independently, simplifying many photomontage operations.

Figure 22:
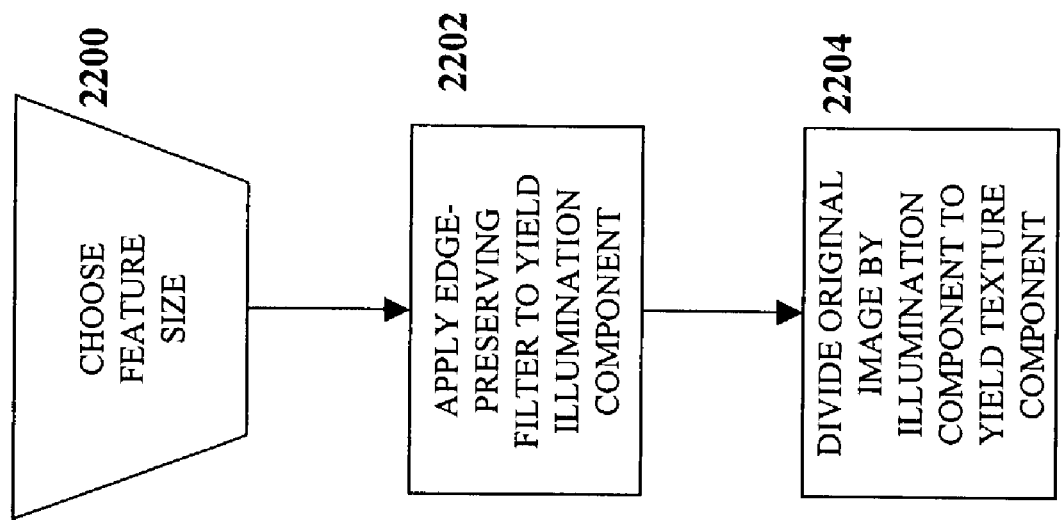
FIG. 22 is a flow diagram of a process to decouple texture and illuminance information from a 3D image in accordance with an embodiment of the invention.

FIG. 22 illustrates a method for decoupling texture and illuminance information from a 3D image in accordance with a preferred embodiment of the invention. The process typically begins with the user specifying a feature size in a feature size choice step 2200. The feature size choice step 2200 preferably involves the user dragging a cursor across a segment of the image. An edge-preserving bilateral filter is then applied in a filter application step 2202. The filter application step 2202 removes small-scale features from the image to yield an illumination component for the image. The original image is then divided by the illumination component in a division step 2204 to yield a texture component for the image.

In some embodiments, the functionality of the systems and methods described above can be implemented as software on a general purpose computer. In such an embodiment, the program can be written in any one of a number of high-level languages, such as FORTRAN, PASCAL, C, C++, LISP, JAVA, or BASIC. Further, the program can be written in a script, macro, or functionality embedded in commercially available software, such as VISUAL BASIC. The program may also be implemented as a plug-in for commercially or otherwise available image editing software, such as ADOBE PHOTOSHOP. Additionally, the software could be implemented in an assembly language directed to a microprocessor resident on a computer. For example, the software could be implemented in Intel 80×86 assembly language if it were configured to run on an IBM PC or PC clone. The software can be embedded on an article of manufacture including, but not limited to, a "computer-readable medium" such as a floppy disk, a hard disk, an optical disk, a magnetic tape, a PROM, an EPROM, or CD-ROM.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A data structure for representing an image including depth information, the data structure comprising two or more layers, each layer comprising:
   an object representing a reference camera;
   a collection of color channel values; and
   a collection of depth channel values, each depth channel value in the collection of depth channel values corresponding to a color channel value in the collection of color channel values.

2. The data structure of claim 1, wherein each layer further comprises a collection of alpha-channel values, each alpha channel value in the collection of alpha channel values corresponding to a color channel value in the collection of color channel values.

3. The data structure of claim 1, wherein each layer further comprises a collection of texture channel values, each texture channel value in the collection of texture channel values corresponding to a color channel value in the collection of color channel values.

4. The data structure of claim 1, wherein each layer further comprises a collection of illuminance channel values, each illuminance channel value in the collection of illuminance channel values corresponding to a color channel value in the collection of color channel values.

5. The data structure of claim 1, wherein each layer further comprises a collection of normal channel values, each normal channel value in the collection of normal channel values corresponding to a color channel value in the collection of color channel values.

6. The data structure of claim 1, wherein the collection of color channel values comprises a two-dimensional array of color channel values, each entry in the two dimensional array representing the color channel value of a pixel in an image.

7. The data structure of claim 1, wherein the object representing the reference camera comprises a world-to-image projection matrix that specifies a field of view of the reference camera.

8. A method of interactively editing an image containing depth information and reference camera information, the method comprising:
a) displaying the image from a viewpoint defined by an interactive camera;
b) receiving an edit to the image;
c) transforming the edit to a viewpoint defined by the reference camera; and
d) applying the transformed edit to the image.

9. The method of claim 8, wherein receiving an edit comprises receiving an edit to color information associated with the image.

10. The method of claim 8, wherein receiving an edit comprises receiving an edit to alpha information associated with the image.

11. The method of claim 8, wherein receiving the edit comprises receiving an edit to depth information associated with the image.

12. The method of claim 11, wherein receiving an edit to depth information comprises:
providing a user with an interactive drawing tool that specifies edits to depth information; and
receiving edits to depth information made by the user using the interactive drawing tool.

13. The method of claim 12, wherein the interactive drawing tool specifies a selected value for depth for a selected portion of the image.

14. The method of claim 12, wherein the interactive drawing tool incrementally adds to the depth for a selected portion of the image.

15. The method of claim 12, wherein the interactive drawing tool incrementally subtracts from the depth for a selected portion of the image.

16. A method of assigning depth to an object in an image, the method comprising:
a) interactively determining a ground reference for the image; and
b) assigning depth information to the object based on the ground reference.

17. The method of claim 16, wherein interactively determining a ground reference comprises specifying a horizon line in the image.

18. The method of claim 16, wherein interactively determining a ground reference comprises specifying a scale factor on depth.

19. The method of claim 16, wherein assigning depth information comprises using an interactive depth painting tool to specify the depth information.

20. The method of claim 16, wherein assigning depth information comprises using geometric primitives to specify the depth information.

21. The method of claim 16, wherein assigning depth information comprises using a three-dimensional model of an object to specify the depth information.

22. The method of claim 16, wherein the ground reference comprises a planar surface.

23. The method of claim 16, wherein the ground reference comprises a non-planar surface.

24. A method of painting in an image that includes depth information, the method comprising:
a) providing a source position and a destination position in the image;
b) identifying a destination region in the image relative to the destination position;
c) determining a source region in the image relative to the source position and corresponding to the destination region;
d) transforming the image information of the source region relative to the depth information of the source region to image information relative to the depth information of the destination region; and
e) copying the transformed image information to the destination region.

25. The method of claim 24, wherein the image comprises two or more layers.

26. The method of claim 25, wherein the source position is in a first layer, and destination position is in a second layer.

27. The method of claim 24, wherein transforming the image further comprises transforming the image relative to lighting information of the source and destination regions.

28. The method of claim 24, wherein transforming the image further comprises transforming the image relative to texture information of the source and destination regions.

29. The method of claim 24, wherein:
the destination region is defined relative to a destination reference camera;
the source region is defined relative to a source reference camera; and
transforming the image information further comprises transforming the image information from a viewpoint defined by the source reference camera to a viewpoint defined by the destination reference camera.

30. The method of claim 24, further comprises temporarily displaying the area locally around the destination region initialized with image information that approximates the area locally around the source region.

31. The method of claim 30, wherein the approximation comprises a geometric mapping.

32. The method of claim 31, wherein the geometric mapping comprises a planar mapping.

33. The method of claim 24, wherein transforming the image occurs substantially concurrently with a user identifying the destination region.

34. The method of claim 33, wherein transforming the image comprises computing a parameterization only for selected active pixels concurrently with the user identifying the destination region.

35. The method of claim 24, further comprising factoring the image information into a texture component and an illumination component, and wherein copying the transformed image comprises copying the texture component of the transformed image and applying the illumination component of the destination region.

36. A method for determining a texture component and an illumination component of an image, the method comprising:
   determining sizes of a small-scale feature in the image and a large-scale feature in the image; and
   using an edge-preserving filter to place small-scale features into the texture component and large-scale features into the illumination component.

37. The method of claim 36, wherein determining sizes comprises interactively selecting a feature size of a texture.

38. The method of claim 36, wherein determining sizes further comprises determining a size and shape of a filter kernel, and wherein the edge-preserving filter evaluates image information over an area defined by the filter kernel.

39. The method of claim 38, wherein the image comprises depth information, and wherein determining a size and shape of the filter kernel comprises using the depth information to determine the size and shape of the filter kernel.

40. The method 38 wherein the image comprises normal information, and wherein determining a size and shape of the filter kernel comprises using the normal information to determine the size and shape of the filter kernel.

41. A system for interactively editing a three-dimensional image, the system comprising:
   a computer comprising a processor, memory, and a display, the memory containing instructions that, when executed by the processor, cause the computer to:
      receive an input image;
      interact with a user to segment the input image into a plurality of layers; and
      interact with a user to apply depth information to the plurality of layers.

42. The system of claim 41, wherein the input image comprises a two-dimensional image.

43. The system of claim 41, wherein the input image comprises a three-dimensional image including depth information.

44. The system of claim 41, wherein the instructions, when executed by the processor, further cause the computer to interact with the user to edit the plurality of layers.

45. The system of claim 41, wherein the instructions, when executed by the processor, further cause the computer to interact with the user to relight the plurality of layers.

46. The system of claim 41, wherein the instructions, when executed by the processor, further cause the computer to interact with the user to copy a source portion of one of the plurality of layers to a destination portion of one of the plurality of layers, transforming the source portion in response to differences in the depth information of the source portion and the destination portion.

* * * * *

UNITED STATES PATENT AND TRADEMARK OFFICE
CERTIFICATE OF CORRECTION

PATENT NO. : 7,199,793 B2 Page 1 of 1
APPLICATION NO. : 10/441972
DATED : April 3, 2007
INVENTOR(S) : Oh et al.

It is certified that error appears in the above-identified patent and that said Letters Patent is hereby corrected as shown below:

On The Title Page,
Item 75, title Inventors
Add --Julie Dorsey, Cambridge, MA (US)--

Signed and Sealed this

Twenty-sixth Day of June, 2007

JON W. DUDAS
*Director of the United States Patent and Trademark Office*